United States Patent [19]
Wu

[11] Patent Number: 5,379,372
[45] Date of Patent: Jan. 3, 1995

[54] APPARATUS AND METHOD FOR DESIGNING A FORM STRUCTURE USING COLUMN AND ROW RULES

[76] Inventor: William C. Wu, 1180 Lochinvar Ave., #46, Sunnyvale, Calif. 94087

[21] Appl. No.: 581,816

[22] Filed: Sep. 13, 1990

[51] Int. Cl.⁶ ............................................. G06F 15/62
[52] U.S. Cl. .................................. 395/148; 395/155; 395/161
[58] Field of Search ............... 395/148, 140, 155, 147, 395/158, 600, 101

[56] References Cited

U.S. PATENT DOCUMENTS

| | | | |
|---|---|---|---|
| 4,622,545 | 11/1986 | Atkinson | 340/747 |
| 4,760,552 | 7/1988 | Yano | 364/900 |
| 4,953,108 | 8/1990 | Kato et al. | 364/523 |
| 4,980,841 | 12/1990 | Sugitani | 364/518 |
| 5,034,899 | 7/1991 | Schult | 364/518 |
| 5,068,802 | 11/1991 | Miyashita et al. | 395/133 |
| 5,144,693 | 9/1992 | Morgan | 395/158 |
| 5,151,975 | 9/1992 | Shiraki et al. | 395/153 |
| 5,157,767 | 10/1992 | Nihei | 395/149 |
| 5,208,905 | 5/1993 | Takakura et al. | 395/148 |

OTHER PUBLICATIONS

Microsoft Excel(In Business version 2.2); 1989; pp. 31–39, 66–69, 116–123, 157–160.

*Primary Examiner*—Heather R. Herndon
*Assistant Examiner*—Joseph Feild
*Attorney, Agent, or Firm*—Skjerven, Morrill, MacPherson, Franklin & Friel

[57] ABSTRACT

A method and an apparatus for designing generalized tables. The method and the apparatus are described by a collection of processes for performing operations such as creating a generalized table, deleting a generalized table, drawing a rule, stretching or shrinking a rule, shifting a set of rules, deleting a rule, aligning a rule, unaligning a rule, combining cells, dividing a cell, creating a region, and deleting a region.

34 Claims, 28 Drawing Sheets

Computer System 400

FIGURE 1C

YOUR FIRM NAME HERE        JOB INVOICE

123 Main Street
YOUR TOWN, STATE and ZIP
Phone (408)123-4567

NO  1001

| PHONE | DATE OF ORDER |
|---|---|
| ORDER TAKEN BY | CUSTOMER'S ORDER NUMBER |
| ☐ DAY WORK   ☐ CONTRACT   ☐ EXTRA ||
| JOB NAME AND NUMBER ||
| JOB LOCATION ||
| JOB PHONE | STARTING DATE |

TO

TERMS

| QTY | MATERIAL | PRICE | AMOUNT | DESCRIPTION OF WORK |
|---|---|---|---|---|

OTHER CHARGES

TOTAL OTHER

LABOR     HR    RATE   AMOUNT

DATE COMPLETED | MATERIALS

Work Order By_____

Signature_____

I hereby acknowledge the satisfactory completion of the above desribed work

TOTAL MATERIALS

Thank you!

TOTAL OTHER

TAX

TOTAL

100

Computer System 400

FIGURE 6

DATA 601 Generalized_Table
```
struct {
    Rule_Group   *column_rule_groups;
    Rule_Group   *row_rule_groups;
    Cell    *cells;
    Region *regions; }
```

DATA 602 Rule_Group
```
struct {
    int  pos;
    Rule    *rules;
    int *alignment_grid; }
```

DATA 603 Rule
```
struct {
    enum {col, row}    kind;
    Rule_Group   *at, *from, *to;
    Rule_Line *line; }
```

DATA 604 Cell
```
struct {
    Rule   **borders; }
```

DATA 605 Region
```
struct {
    Rule   **borders;
    int *corners;
    Rule_Line *around;
    Pattern fill; }
```

FIGURE 7A

PROCESS 701 Create_a Generalized Table
    INPUTS: x1, x2, y1, y2;
    OUTPUTS: GT1
    TEMPORARIES: CRG1, CRG2, RRG1, RRG2, CR1, CR2, RR1, RR2, CL1

BEGIN
    Get Coordinates (x1, y1, x2, y2); Allocate column rule groups CRG1
    with x1, CRG2 with x2;
    Allocate row rule groups RRG1 with y1, RRG2 with y2;
    Allocate column rule CR1 with (at: CRG1, from: RRG1, to: RRG2);
    Allocate column rule CR2 with (at: CRG2, from: RRG1, to: RRG2);
    Allocate row rule RR1 with (at: RRG1, from: CRG1, to: CRG2);
    Allocate row rule RR2 with (at: RRG2, from: CRG1, to: CRG2);
    Add CR1 to CRG1, CR2 to CRG2, RR1 to RRG1, RR2 to RRG2;
    Allocate a cell CL1 with (CR1, RR1, CR2, RR2);
    Allocate a generalized table GT1 with CL1, CRG1, CRG2, RRG1, RRG2;
    END

PROCESS 702 Delete a Generalized Table
    INPUTS: GT1
    OUTPUTS: NONE
    TEMPORARIES: NONE BEGIN
    Remove and free all regions in GT1;
    Remove and free all cells in GT1;
    Remove and free all rules in GT1;
    Remove and free all rule groups in GT1;
    Free the generalized table GT1;
    END

FIGURE 7B

PROCESS 703 Draw a Rule
  INPUTS: GT1, (x1, y1), (x2, y2), draw_mode
  OUTPUTS: NONE
  TEMPORARIES: NONE BEGIN
  Get point 1 (x1, y1) and point 2 (x2, y2);
  Get draw_mode;
  IF (draw_mode is column) THEN
      Use PROCESS 704 to draw a column rule;
  ELSE
      Use PROCESS 705 to draw a row rule;
  END

PROCESS 704 Draw a Column Rule

INPUTS: GT1, (x1, y1), (x2, y2)
  OUTPUTS: NONE
  TEMPORARIES: CR1, CRG1, CRG2, RR1, RR2

BEGIN
  Get point 1 (x1, y1) and point 2 (x2, y2);
  IF ( point 1 is close to a column rule CR1 ) THEN
      Set CRG1 to be CR1.at;
  ELSE
      IF (point 1 is close to a column rule group CRG2) THEN
          IF (CRG2.alignment_grid is not ON) THEN
              Allocate and add a column rule group CRG1 with x1;
          ELSE Set CRG1 to be CRG2
      ELSE Allocate and add a column rule group CRG1 with x1;
  IF (y1<<y2) THEN swap y1 and y2;
  Find the lowest row rule RR1 such that
      (RR1.from.pos<<=x1<<=RR1.to.pos) and (RR1.at.pos<<=y1);
  Find the highest rule RR2 such that
      (RR2.from.pos<<=x1<<=RR2.to.pos) and (RR2.at.pos>>=y2);
  Use PROCESS 724 to replace rules in CRG1 between RR1.at and RR2.at;
  END

PROCESS 705 Draw a Row Rule
  BEGIN
  This process is similar to PROCESS 704, hence omitted;
  END

FIGURE 7C

PROCESS 706 Stretch/Shrink a Rule
    INPUTS: GT1, R1, END1, (x1, y1)
    OUTPUTS: NONE
    TEMPORARIES: NONE BEGIN
    Get the rule R1 and the end END1 to be stretched or shrinked;
    Get the new point (x1, y1);
    IF (R1 is a column rule) THEN
        IF (the end point END1 is the "from" end) THEN
            Use PROCESS 707 to strech/shrink;
        ELSE
            Use PROCESS 708 to strech/shrink;
    ELSE
        IF (the end point END1 is the "from" end) THEN
            Use PROCESS 709 to strech/shrink;
        ELSE
            Use PROCESS 710 to strech/shrink;
    END

FIGURE 7D

PROCESS 707 Stretch/Shrink a Column Rule's Upper End
    INPUTS: GT1, CR, (x1, y1)
    OUTPUTS: NONE
    TEMPORARIES: RR1, RR2, CR1, CR2

BEGIN
    Get the column rule CR and the point (x1, y1);
    IF (y1<<=CR.from.pos) THEN
        BEGIN
        Find the lowest row rule RR1 such that (RR1.from<<=CR.at<<=RR1.to)
            and (RR1.at.pos<<=y1);
        Use PROCESS 724 to replace rules in CR.at between RR1.at, CR.to;
        END
    ELSE
        BEGIN
        Find the highest row rule RR2 such that RR2 hangs on CR.at and
            CR is the only rule in CR.at with from<<=RR2.at<<=to;
        IF (RR2 does not exist OR (RR2 exists AND y1<<RR2.at.pos)) THEN
            Find the lowest row rule RR2 such that
                (RR2.from<<=CR.at<<=RR2.to) and (RR2.at.pos<<=y1);
        IF (RR2.at=CR.to) THEN
            Use PROCESS 716 to delete CR;
        ELSE
            BEGIN
            Use PROCESS 726 to split CR at RR2.at into CR1 and CR2;
            Let CR2 be the column rule whose "from" is CR.from and whose "to" is RR2.at;
            Use PROCESS 716 to delete CR2
            END
        END
    END PROCESS 708 Stretch/Shrink a Column Rule's Lower End
    BEGIN
    This process is similar to PROCESS 707, hence omitted;
    END PROCESS 709 Stretch/Shrink a Row Rule's Left End
    BEGIN
    This process is similar to PROCESS 707, hence omitted;
    END

FIGURE 7E

PROCESS 710 Stretch/Shrink a Row Rule's Right End

BEGIN
    This process is similar to PROCESS 707, hence omitted;
    END

PROCESS 711 Shift Rules
    INPUTS: GT1, RS, (xd, yd)
    OUTPUTS: NONE
    TEMPORARIES: RRGS, CRGS
    BEGIN
    Get rules RS to be shifted;
    Get the distance to be moved (xd, yd);
    Find column rule groups RRGS containing rules to be shifted;
    Find row rule groups CRGS containing rules to be shifted;
    IF (xd<<0) THEN
        FOR (FROM the leftest rule group TO the rightest rule group) DO
            Use PROCESS 712 to shift one column rule group a time;
    ELSE IF (xd>>0) THEN
        FOR (FROM the rightest rule group TO the leftest rule group) DO
            Use PROCESS 713 to shift one column rule group a time;
    IF (yd<<0) THEN
        FOR (FROM the highest rule group TO the lowest rule group) DO
            Use PROCESS 714 to shift one row rule group a time;
    ELSE IF (yd>>0) THEN
        FOR (FROM the lowest rule group TO the highest rule group) DO
            Use PROCESS 715 to shift one row rule group a time;
    END

FIGURE 7F

PROCESS 712 Shift a Column Rule Group Left
   INPUTS: GT1, CRG0, x1
   OUTPUTS: NONE
   TEMPORARIES: CRG1, CRG2, CR1, RR1

BEGIN
   Get the column rule group CRG0 and "x1" the x-coordinate to be shifted to;
   Find the leftest column rule group CRG1, such that CRG1.pos<<=x1;
   FOR (EVERY column rule group CRG2, such that CRG0>>CRG2>>=CRG1) DO
      FOR (EVERY column rule CR1 in CRG0) DO
         BEGIN
         Use PROCESS 724 to replace rules in CRG2 between
            CR1.from and CR1.to;
         FOR (EVERY row rule RR1, such that CR1.from<<=RR1.at<<=CR1.to) DO
            IF (CRG2<<=RR1.to<<CRG0) THEN
               IF (CRG2<<=RR1.from<<CRG0) THEN
                  Use PROCESS 716 to delete RR1;
               ELSE
                  Use PROCESS 725 to replace rules in RR1.at between
                     RR1.from and CRG0;
            ELSE
               IF (CRG2<<=RR1.from<<CRG0) THEN
                  BEGIN
                  Use PROCESS 725 to replace rules in RR1.at between
                     RR1.from and CRG0;
                  Use PROCESS 716 to delete the new rule in RR1.at
                     between RR1.from and CRG0;
                  END
         FOR (EVERY column rule CR2 in CRG2, such that
            CR2.from>>=CR1.from AND CR2.to<<=CR1.to) DO
            Use PROCESS 716 to delete CR2;
      END;
   Set CRG0.pos to be x1 and move CRG0 before CRG1;
   END PROCESS 713 Shift a Column Rule Group Right
   BEGIN
   This process is similar to PROCESS 712, hence omitted;
   END

FIGURE 7G

PROCESS 714 Shift a Row Rule Group Up
   BEGIN
     This process is similar to PROCESS 712, hence omitted;
   END

PROCESS 715 Shift a Row Rule Group Down
   BEGIN
     This process is similar to PROCESS 712, hence omitted;
   END

PROCESS 716 Delete a Rule
   INPUTS: GT1, R1
   OUTPUTS: NONE
   TEMPORARIES: R2

BEGIN
   Get the rule R1;
   IF ( (there exist at least one rule R2 hanging on R1.at) AND
      (R1 is the only one in R1.at such that R1.from<<=R2.at<<=R1.to) ) THEN
      RETURN;
   Remove regions whose borders contain R1;
   Combine cells that were divided by R1;
   Remove and free R1;
   IF (R1.at contains no other rules) THEN
      Remove and free R1.at;
   END

PROCESS 717 Align A Rule to A Rule Group
   INPUTS: GT1, R1, RG
   OUTPUTS: NONE
   TEMPORARIES: NONE BEGIN
   Get the rule R1 and the rule group RG;
   Use PROCESS 718 to unalign R1;
   Use PROCESS 711 to shift R1 to RG.pos;
   Remove R1 from new R1.at;
   Remove and free new R1.at;
   Add R1 to RG;
   END

FIGURE 7H

PROCESS 718 Unalign A Rule
    INPUTS: GT1, R1
    OUTPUTS: NONE
    TEMPORARIES: RG, RG0

BEGIN
    Get the rule R1 to be unaligned;
    Let RG0 be the rule group containing R1;
    IF (RG0 has only R1) THEN RETURN;
    Allocate a rule group RG with RG0.pos;
    Add RG to the generalized table;
    Remove R1 from RG0;
    Add R1 to RG;
    END PROCESS 719 Combine Cells
    INPUTS: GT1, CLS
    OUTPUTS: NONE
    TEMPORARIES: R1

BEGIN
    Get the area of cells CLS;
    FOR (EVERY rule R1 in the generalized table) DO
        IF (a portion of R1 lies inside CLS) THEN
            Use PROCESS 726/727 to split R1 at every intersection point;
    FOR (EVERY rule R1 in the generalized table) DO
        IF (R1 is inside CLS) THEN
            Use PROCESS 716 to delete R1;
    END

FIGURE 7I

PROCESS 720 Divide Cells
   INPUTS: GT1, CLS
   OUTPUTS: NONE
   TEMPORARIES: R1, COL, ROW, RG, RG1, RG2

BEGIN
Get the area of cells CLS, and number of columns COL and rows ROW;
IF ( ( (COL>>1) AND (ROW>>1) AND (CLS contains more than one CELL) )
OR
    ( (COL>>1) AND (ROW<<=1) AND (a portion of a column rule lies inside CLS) )
    OR ( (COL<<=1) AND (ROW>>1) AND (a portion of a row rule lies inside CLS) )
    OR ( (COL<<1) AND (ROW<<1) ) ) THEN RETURN;
Allocate and add COL<-><-><197>1 column rule groups that equally divide the cell;
Allocate and add ROW<197>1 row rule groups that equally divide the cell;
FOR (EVERY rule group RG just allocated) DO
    BEGIN
    Find the intersection of RG and CLS;
    FOR (EVERY range RG1 to RG2 inside CLS) DO
        Allocate and add rule with (RG, RG1, RG2);
    END;
Remove cells in CLS;
Allocate and add new divided cells;
END

PROCESS 721 Create a Region
   INPUTS: GT1, BDR
   OUTPUTS: NONE
   TEMPORARIES: RGN BEGIN
Get the border BDR of the region;
Allocate the region RGN with the border;
Add the region RGN to the generalized table GT1;
END

FIGURE 7J

PROCESS 722 Delete a Region

INPUTS: GT1, RGN
    OUTPUTS: NONE
    TEMPORARIES: NONE

BEGIN
    Get the region RGN to be deleted;
    Remove and free the region;
    END

PROCESS 723 Set an Alignment Grid
    INPUTS: GT1, R, Grid_Mode
    OUTPUTS: NONE
    TEMPORARIES: RG BEGIN
    Get the rule group RG that contains rule R;
    set RG.alignment_grid to Grid_Mode;
    END

FIGURE 7K

PROCESS 724 Replace Rules in a Column Rule Group

INPUTS: GT1, CRG, RRG1, RRG2
    OUTPUTS: NONE
    TEMPORARIES: CR, CR1, CR2, CL

BEGIN
    Get the column rule group CRG, and two row rule group RRG1, RRG2;
    Allocate a column rule CR with (CRG, RRG1, RRG2);
    FOR (EVERY rule CR1 IN CRG) DO
        Use PROCESS 726 to split CR1 at RRG1;
    FOR (EVERY rule CR1 IN CRG) DO
        Use PROCESS 726 to split CR1 at RRG2;
    Mark rules in CRG between RRG1 and RRG2 for removal;
    Update regions whose border contains marked rules;
    Update cells whose border contains marked rules;
    Remove and free all marked rules;
    Add CR to CRG;
    FOR (EVERY cell CL divided by CR) DO
        BEGIN
        Allocate and add new cells based on new borders;
        Remove and free CL;
        END;
    END

PROCESS 725 Replace Rules in a Row Rule Group
    BEGIN
    This process is similar to PROCESS 724, hence omitted;
    END

FIGURE 7L

PROCESS 726 Split a Column Rule
    INPUTS: GT1, CR, RRG
    OUTPUTS: CR1, CR2
    TEMPORARIES: NONE BEGIN
    Get the column rule CR to be splitted and the row rule group RRG;
    IF ( (CR.from>>=RRG) OR (CR.to<<=RRG) ) THEN RETURN;
    Allocate a rule CR1 with (CR.at, CR.from, RRG);
    Allocate a rule CR2 with (CR.at, RRG, CR.to);
    Add CR1, CR2 to the rule group CR.at;
    Update all regions whose border contains CR;
    Update all cells whose border contains CR;
    Remove and free CR;
    END

PROCESS 727 Split a Row Rule
    BEGIN
    This process is similar to PROCESS 726, hence omitted;
    END

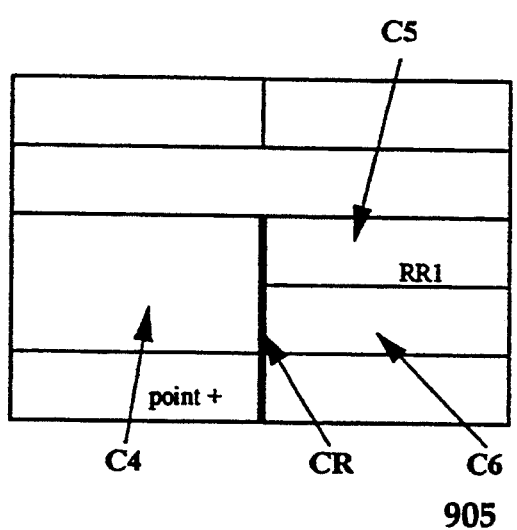 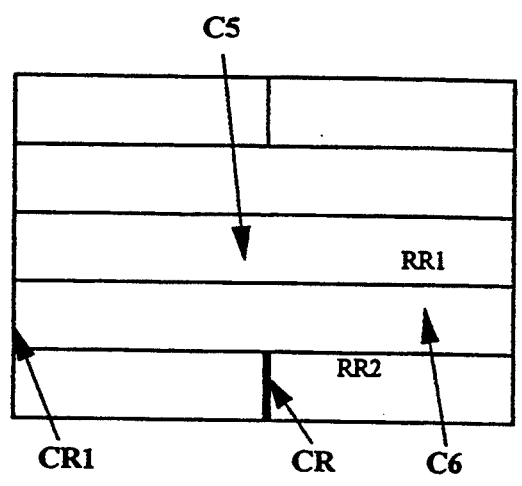
FIGURE 9B-1
FIGURE 9B-2

FIGURE 13A 1301

| | | |
|---|---|---|
| CL1 | CL2 | CL3 |

FIGURE 13B 1302

| CL11 | CL12 | CL13 |
|---|---|---|
| CL21 | CL22 | CL23 |
| CL31 | CL32 | CL33 |

| CL11 | CL12 |
|---|---|
| CL21 | CL22 |
| CL31 | CL32 |

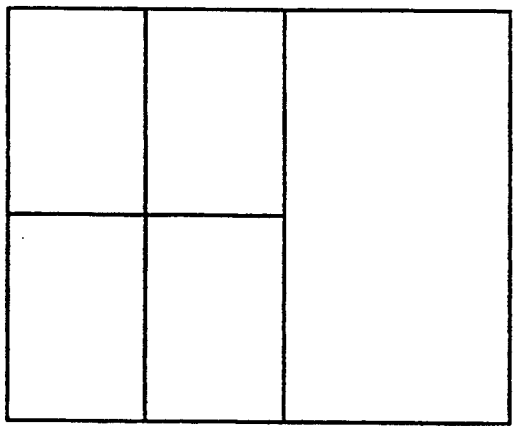
FIGURE 14A     1401
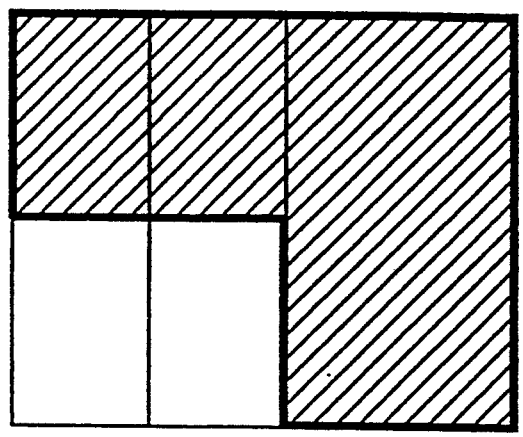
FIGURE 14B     1402
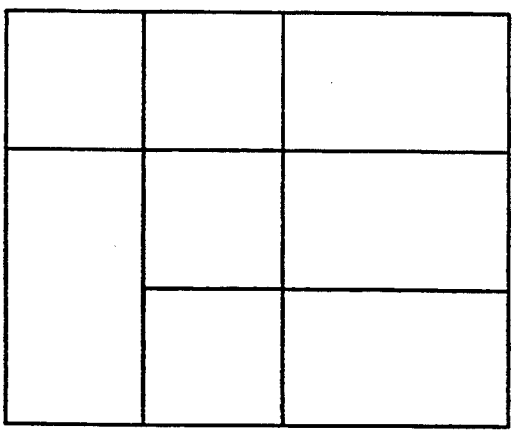
FIGURE 14C     1403
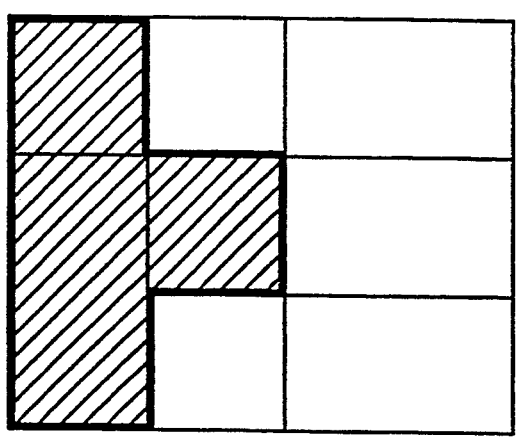
FIGURE 14D     1404

APPARATUS AND METHOD FOR DESIGNING A FORM STRUCTURE USING COLUMN AND ROW RULES

CROSS REFERENCE TO MICROFICHE APPENDIX

Appendix A, which is a part of the present disclosure, is a microfiche appendix consisting of 1 sheet of microfiche having a total of 97 frames. Microfiche Appendix A is a listing of computer programs and related data in one embodiment of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention pertains to the field of user interfaces in computer-controlled video display systems. Particularly, this invention relates to an interface for designing generalized tables for use with computer software to create useful papers such as business forms.

BACKGROUND OF THE INVENTION

In software, a generalized table is a set of related oblique, vertical and horizontal conceptual line segments called, respectively, diagonal, column and row rules. Enclosed areas and partitions are formed by these rules intersecting and collinearly joining each other. The smallest unit of such enclosed areas is called a cell. In a generalized table, rules and the areas they enclose need not be visible on the video display. FIG. 1A shows the visible structure of a generalized table 100, although its defined structure includes an invisible enclosed area 101 which is shown in FIG. 1B. Generalized table 100 may be used to construct a business form as shown in FIG. 1C.

There have been three approaches to providing a user interface to allow a user to design a generalized table in the prior art: (1) the graphic approach, (2) the box approach, and (3) the regular table approach.

The graphic approach in the prior art treats a generalized table as a collection of unrelated column and row rules arranged in a particular way. To create a generalized table, a user first draws a rectangle as the outer boundary of the generalized table. He or she then draws each column or row rule carefully, making sure both ends of each rule touch other rules to form enclosed areas. In this approach, each rule is an independent graphic object, and can be drawn, deleted, stretched and shifted (i.e., moved in a direction perpendicular to the rule) individually without impacting any other rule. Under this approach, when a rule is shifted to change the size of an enclosed area, all other rules previously touching the shifting rule may become disconnected, so that some areas may become no longer enclosed, and each rule must be stretched or shrunk one by one to restore the previously enclosed areas. For example, in FIG. 2, when the top rule 201 in the upper table 20a is shifted upwards, the top ends of all connecting (i.e. touching) rules become disconnected as shown in the lower table 20b. Because the concepts of cell boundaries, columns of cells, or rows of cells are not present, many common operations, called row-based or column-based operations, such as setting column width or row height, or automatically centering text in a cell, are not available in a system using the graphic approach.

The second approach in the prior art treats each cell of a generalized table as a box. Each cell can be created, deleted, moved, stretched, and shrunk independently without impacting other cells. The background pattern, the style, and the thickness of the border of each cell can therefore also be changed independently. Under the box approach, a generalized table is built by placing cells adjacent to each other. With this approach, when a cell is stretched, shrunk, or moved, all the adjacent cells must be adjusted one by one. For example, as shown in FIG. 3, a simple size modification to cell 301 in table 30a of the upper half of the figure results in the table 30b shown in the lower half of the figure. Table 30b will require significant effort in adjusting the other cells (e.g. 302, 303,304) to form a rectangular table again. Furthermore, just like the graphic approach, the box approach does not recognize columns and rows of cells, and cannot provide column-based or row-based operations.

The regular table approach is the third alternative in the prior art. A regular table is an array of cells arranged in a rectangular pattern forming rows and columns, with the cells in each column having the same width, and the cells in each row having the same height. A typical prior art system provides a regular table automatically upon start-up. The dimension, width or height of each table column or row can be adjusted independently, and the rest of the cells in the column or row will be adjusted accordingly. Under the regular table approach, the dimensions of each cell in each column or row can easily be set. However, under the strict regular table approach, it is not possible to combine individual cells and hence, generalized tables cannot be created under such systems.

Other systems in the prior art using a modified regular table approach provide split-column tables, i.e. the requirement that all cells in the same column must have the same size is relaxed. In this approach, for example, a column (the "main" column) can be split into several smaller columns in some parts of the main column. This technique is often used in the design of business forms, for example, to provide a column bearing a major heading, underneath which smaller sub-columns bearing minor headings are provided. Since the split-column table is just a special (though useful) case of the generalized table, a system using the split-column table approach will not be capable of building a generalized table without additional features.

Still another system in the prior art under a modified regular table approach uses parameters to generate the regular table. In one such system, once the size (i.e. number of rows and columns) and location of the table are defined, the table is generated and placed in the designated location. In that system, the column rules and row rules are always set to the same width and style, with the exception of the rule associated with the table header, which can be set to a different style.

There exist other systems in the prior art using the parameter approach, which provide a command to combine cells and have another command to split cells. Even with this augmented ability to combine cells, the number of steps necessary to create a generalized table as complex as the one shown in FIG. 1A is still large.

For example, in order to create a column of cells which is single-cell per row except for the first two rows, which each contains two cells, the user must either split cells in the first two rows, or combine cells from the third row down. Furthermore, it is not possible to use this approach to support angled column headers nor triangular cells.

In light of these limitations in known systems, a simpler system is clearly desirable for use in designing generalized tables.

SUMMARY OF THE INVENTION

In accordance with the present invention, a structure and a method for designing generalized tables are provided. An embodiment of the present invention may include one or more of a number of processes.

One process provides for drawing rules, wherein both ends of a rule are automatically extended, sized and hung onto any cross rules. Cells cut across by a new rule are automatically divided. When a newly drawn rule overlaps other existing rules, the portions of the existing rules overlapped by the new rule are cut and deleted.

Another process provides for keeping a rule hung onto other rules. Under this process, when a rule is shifted, all other rules hung to it are automatically stretched or shrunk, in order to maintain their hanging relationship with the shifted rule. Another process provides for aligning rules. Rules that are aligned are collinear. Under this process, when one of the aligned rule is shifted, the rest of the aligned rules are also shifted to maintain the collinear relationship.

Another process provides for deleting rules. Cells divided by a rule to be deleted are automatically combined when the dividing rule is deleted.

Another process provides for stretching and shrinking a rule from one end. Under this process, the stretched/shrunk end is removed from the rule onto which it is currently hung, and is hung onto a new cross rule. If the rule is stretched, cells cut across by the stretched portion of the rule are automatically divided. If the rule is shrunk, cells previously divided by the shrunk portion are combined. Under this process, also, a rule is not allowed to shrink so much that one of the rules hung to it becomes "dangling".

Another process provides for shifting rules. When the shifted rule sweeps over a portion of another rule, that portion of rule swept over is automatically severed and deleted. Cells partially covered by the swept area have their boundaries automatically adjusted so that their areas no longer cover the swept area, and cells completely covered by the sweep are deleted.

Another process provides for moving rules as a group. When one of the grouped rules is moved, all rules in the group are moved together.

Another process provides for combining cells. Under this process, an area of cells contiguously placed are combined into one cell, and the portion of any rule inside the new cell are deleted.

Another process provides for dividing rectangular cells into a number of columns and rows. Under this process, new column rules and row rules are inserted to divide the cell.

Another process provides for creating and deleting regions. Under this process, an enclosed area with its own fill patterns, border styles and corner shapes can be created and deleted.

The present invention is better understood after consideration of the detailed description and the accompanying drawings.

BRIEF DESCRIPTION OF THE DRAWINGS

FIG. 1C shows a business form using the generalized table 100 of FIG. 1A.

FIG. 6 shows the data descriptions of a system in accordance with the present invention.

FIGS. 7A-7L show the pseudo-code of some processes of a system for designing a generalized table in accordance with the present invention.

FIGS. 9A and 9B show three examples of the operation to stretch/shrink a column rule from its upper end.

FIG. 13 shows two examples of the operation to split cells.

FIG. 14 shows two examples of the operation to create regions. These two examples, seen in reverse order, also serve as examples of the operation to delete regions.

DETAILED DESCRIPTION OF THE PREFERRED EMBODIMENTS

The present invention provides a system for designing generalized tables in a computer system. In the following description, in order to illustrate the present invention, references are made to screen displays, cursor and control devices. It will be obvious, however, to one of ordinary skill in the art that these devices are provided to illustrate the application of the present invention and are not required to practice the present invention. In other instances, generally understood components of computer systems are not described in detail so as not to unnecessarily obscure or burden the description of the present invention. The embodiments of the present invention described below are provided in software. However, according to the principles of the present invention illustrated below, hardware embodiments of the present invention are also feasible.

Overview of Hardware

Figure 4:
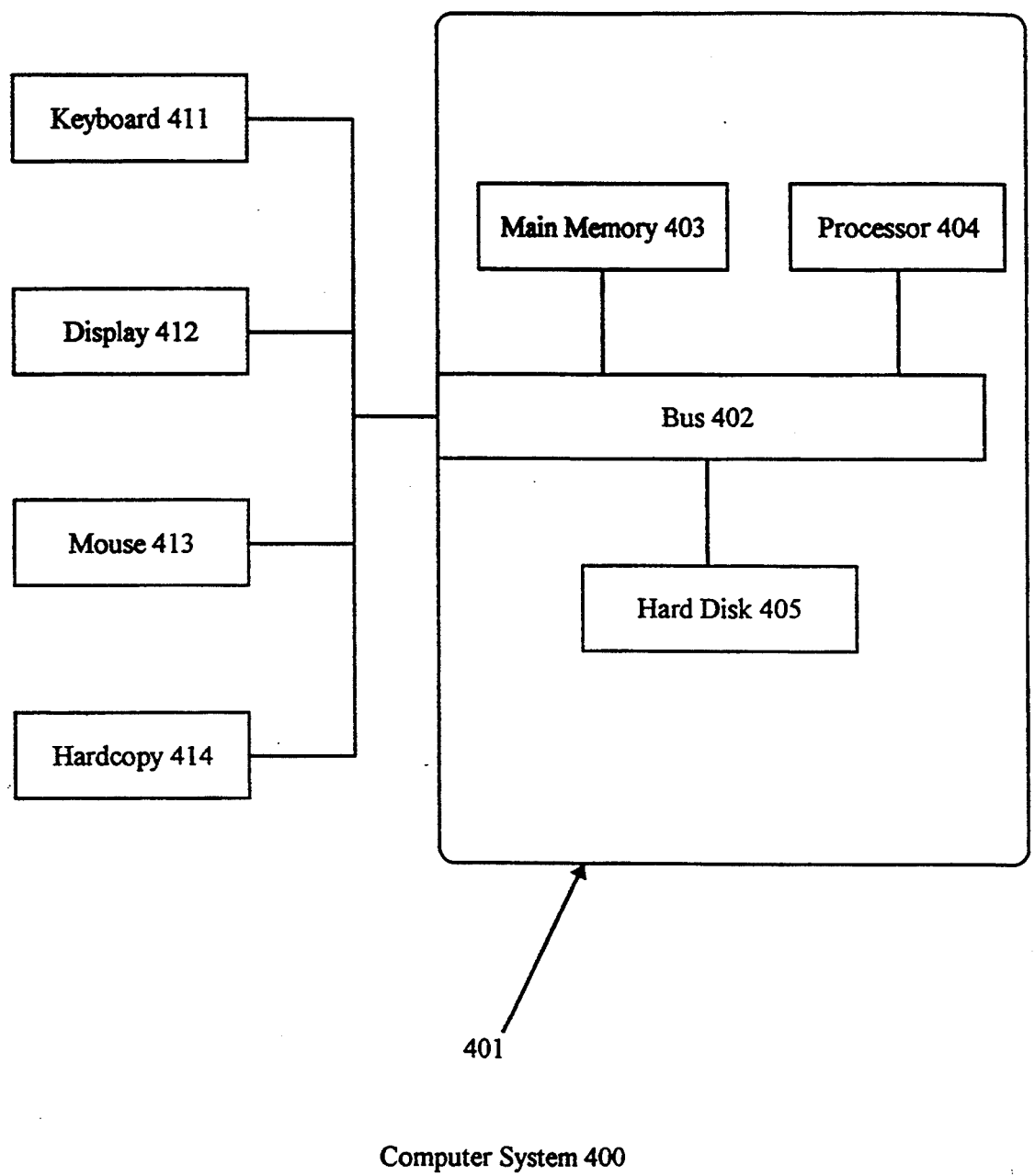
FIG. 4 shows a computer system 400 which may be used to run a software embodiment of the present invention.

FIG. 4 illustrates a computer system 400 which may be used to run an embodiment 500 (see FIG. 5) of the present invention. Computer system 400 comprises a main unit 401 and several external devices: a keyboard 411, a display device 412, a pointing device or "mouse" 413, and a hard copy device 414. The main unit 401 comprises a main memory 403, a processor 404, a bus 402, and a hard disk 405 which is used as secondary storage. In this embodiment, processor 404 is an Intel 80386 microprocessor manufactured by Intel Corporation. In another embodiment, the computer system 400 may be one of a number of personal computers, such as those manufactured by COMPAQ, or many other manufacturers. Indeed, the present invention may be implemented also in computer systems other than personal computers, such as minicomputers or computers commonly known as mainframes.

In addition to the computer system 400, the operating system and the graphic environment of this embodiment shown in FIG. 4 are, respectively, DOS version 3.2 and Windows version 2.1 or 3.0 DOS and Windows are software obtainable from Microsoft Corporation of Richmond, Washington.

Overall Architecture

Figure 5:
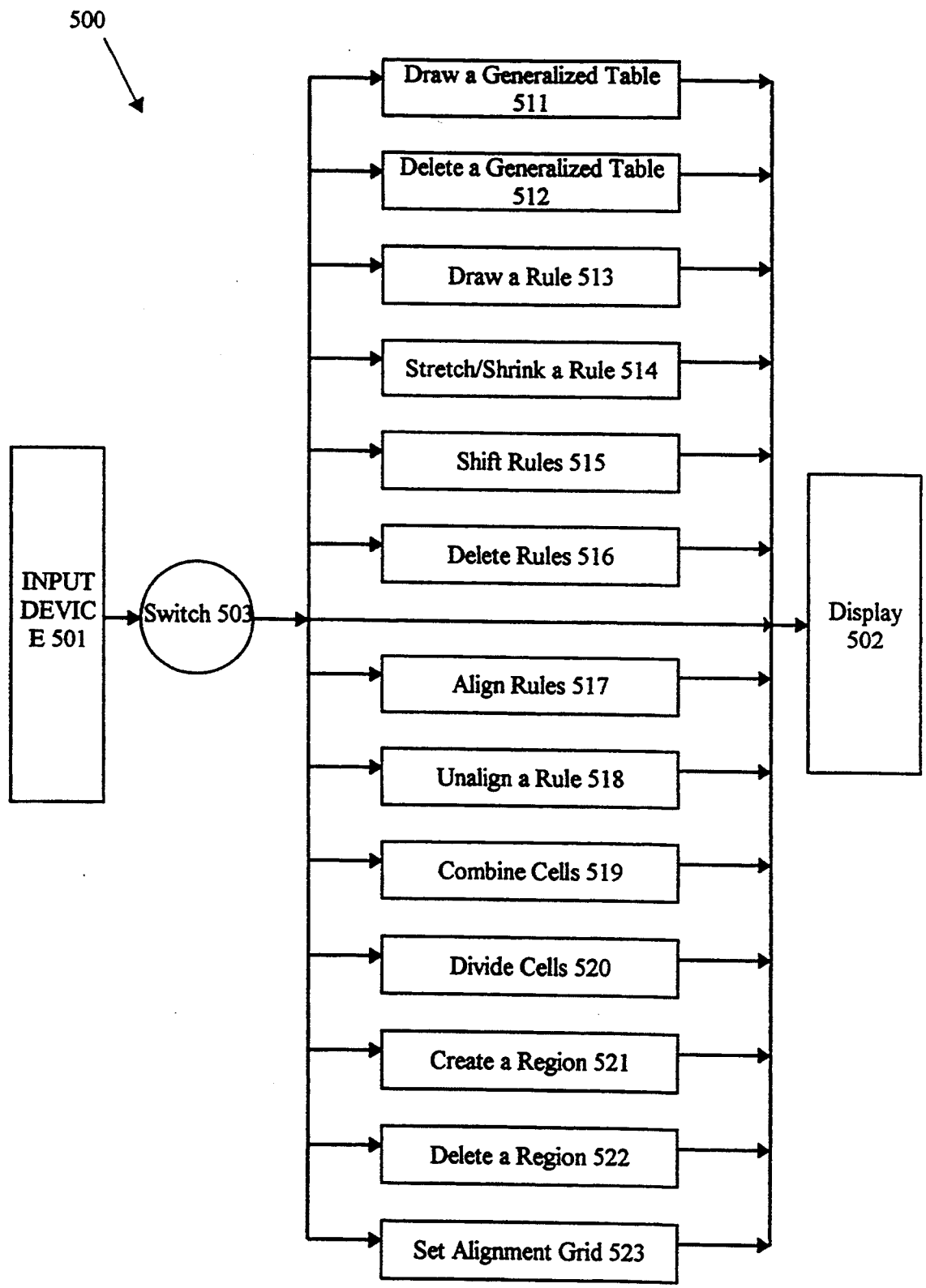
FIG. 5 shows the overall architecture of a system for designing a generalized table in accordance with the present invention.
Figure 8A:
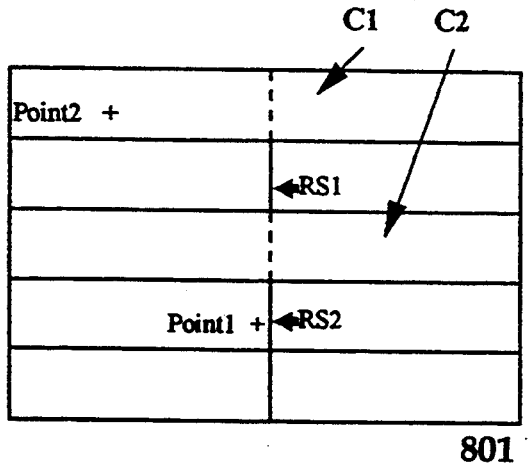
FIG. 8 shows three examples of the operation to draw a column rule.
Figure 8B:
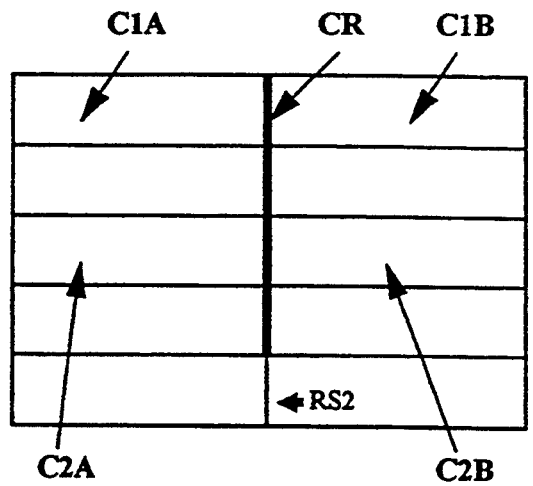
Figure 8C:
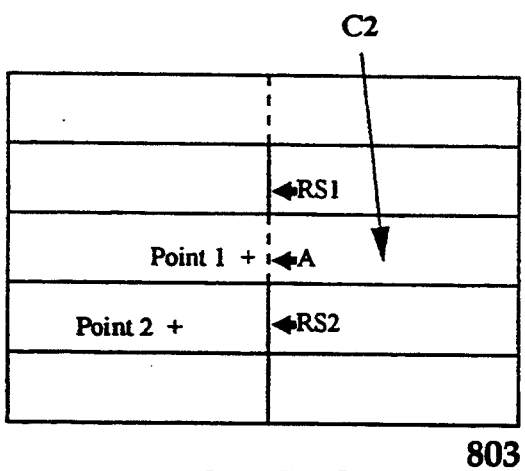
Figure 8D:
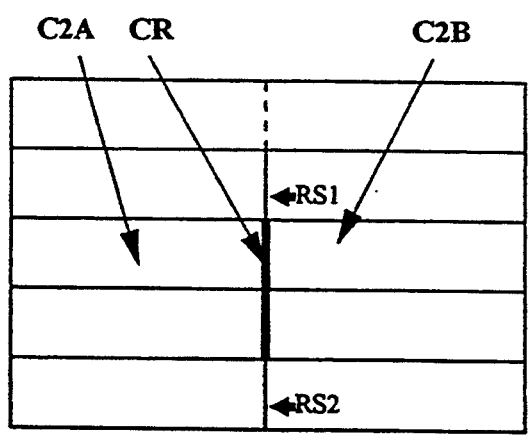
Figure 8E:
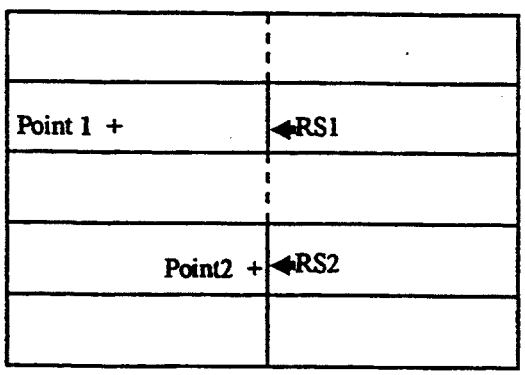
Figure 8F:
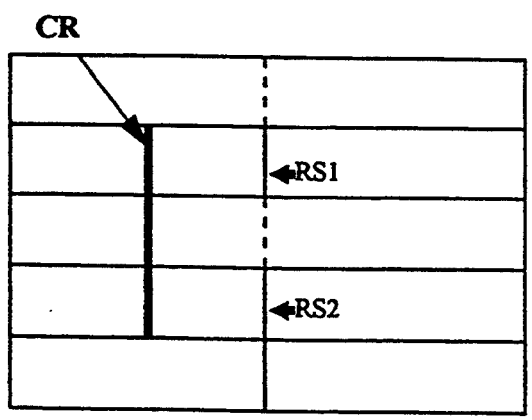

The overall architecture of the embodiment 500 of the present invention is shown in FIG. 5. The Input Device Process 501 collects all input data from the Keyboard 411 and the Mouse 412, converts this data into messages, which are then sent to the Switch 503. The Switch 503 accepts messages from the Input Device 501, intercepts and consumes the messages intended for it to set its mode and relays the remaining messages to one of the Processes 511–522 according to its mode. The structure of the switch 503 depends on its graphic environment. For example, in the Microsoft Windows environment, the input device sends in one at a time a signal key stroke, an action on the button of a mouse, a coordinate, or a command. The switch then collects these inputs, interprets them, and determines whether and which process to call. For example, in order to draw a generalized table, the "draw table" command must be identified along with two input coordinates. The command and the input coordinates come in several messages. The switch must set internal mode in order to keep track of whether the entire set of input data is received. Processes 511–523 interpret the messages to perform functions such as creating a generalized table (511), deleting the current generalized table (512), or editing the current generalized table (513–523).

Switch 503 and Processes 511–523 also send data and messages to the Display Process 502 to update the display 412 of the computer system 400. The Input Device Process 501 and the Display Process 502 are supplied by the graphic environment such as Windows version 2.1 discussed above.

Data Description

The data structure of the generalized table to be operated upon by Processes 511–523 is described in FIG. 6 using pseudo-code of the "C" programming language.

DATA 601 represents a generalized table as a record comprising four fields: an array "row_rule_groups" of the "rule group" record type (defined below), an array "column_rule_groups, also of the "rule group" record type, an array "cells" of the "cell" record type (defined below) and an array "regions" of the "region" record type (defined below). The rule groups in both arrays of rule group record types (i.e. column_rule_groups and row_rule_groups) are sorted in ascending order, i.e., the "pos" field (see below) of each rule group is always smaller or equal to the "pos" field of its successor rule group record in the array. Although described here as arrays, any array data entity discussed herein can also be implemented in a number of other data structures, such as linked lists.

In this embodiment, each column rule of the generalized table must lie on at least one row rule, each row rule of the generalized table must lie on one column rule, and each diagonal rule must line on at least one row rule and at least one column rule. (In this embodiment, no process is provided for manipulation of diagonal rules.) A first rule is said to be "lying on" a second rule if an end point of the first rule touches a point in the second rule.

DATA 602 represents a rule group as a record comprising three fields: a number "pos", an array "rules" of the "rule" record type (defined below), and a boolean value "alignment_grid". A rule group represents a collection of rules of the same kind with the same "longitudinal" position are internally linked, and shifted as a single unit. The longitude of a rule represents the relative physical position of the rule. If we represent the plane on which the generalized table is to be located in a 2-dimensional Cartesian coordinate system, the longitude of a row rule can be seen as the y-coordinate of any point in the row rule, and the longitude of a column rule can be seen as the x-coordinate of any point in the 5 column rule. For brevity, in the following description, a reference to a rule's or a rule group's x- or y-coordinate is to be understood as a reference to the longitude of the rule or the common longitude of the rules in the rule group. The longitude of the rule group is specified in the "pos" field, and the rules of the each group are collected in the "rules" field of the rule group. The "alignment_grid" field of a rule group is a convenient field used to facilitate editing, and is not a necessary part of the generalized table. The "alignment_grid" value indicates whether alignment grid-related operations are activated. The alignment grid of a rule group is the conceptual line which extends infinitely along the longitude of a rule group.

In this embodiment, two rules are said to be aligned under a given operation, if both rules are of the same column or row type and the two rules remain separated a fixed distance in the orthogonal direction before and after the operation. In the case when this fixed distance of separation is zero, the rules are said to be collinear. In this embodiment, alignment relationships are temporary, i.e., remaining in force only for duration of the operation, and are used in the shift operation (PROCESS 721, see below). Collinear relationships, however, are permanent, i.e. remaining in force after the completion of the operation and dissociated only by a special process. In this embodiment, all rules in a rule group are collinear.

DATA 603 represents a rule as a record comprising five fields: a value "kind" which indicates whether the rule is a row or column rule, three pointers "at", "from" and "to" each pointing to a rule group, and an array "lines" with elements of the "rule line" type (defined below). As mentioned above, a rule can be either a column rule or a row rule. A rule may contain none, one, or any number of lines. Each line, specified by the rule line record type (not shown), has a number of attributes including its position and thickness. As mentioned above, each column or row rule is a conceptual line segment, and is not necessarily displayed on a video display. Since each rule is a conceptual line segment, each line which implements a rule may in fact be, for example, offset from the location of the rule, be slanted at an angle to the rule, or be displayed as one of many styles, such as a solid or dash line, an arrow end, one of various thicknesses, indented, or a combination of one or more of the above styles. If a rule contains no line, though it still defines and separates cells, the rule is not visible from the display 412. Each rule belongs to the rule group specified in the "at" field, with one end of the rule "hanging" onto a rule in the rule group specified in the "from" field and the other end of the rule hanging onto a rule in the rule group specified in the "to" field. An end of a rule A is said to hang onto another rule B under an operation, if rule A and rule B are of different column or row types and one end of rule A lies on rule B before and after the operation. A generalized table requires only that each rule lies on a rule of a different row or column type from itself after an operation, but not necessarily a hanging relationship, i.e., lying on the same rule before and after an operation. Clearly, when the same end point of a rule hangs onto two rules under an operation, the two rules are of the same collinear group under the operation. In this embodiment, the hanging relationship is "permanent", i.e. a hanging relationship between rules appropriately located implicitly exists, unless one of the rules in the hanging relationship is deleted.

DATA 604 represents a cell as a record comprising an array "borders" of pointers to rules. By definition, no two cells may overlap. The "borders" field specifies an array of rules that enclose the cell, sorted in clockwise order beginning at the lower left corner of the cell.

A variety of attributes (not shown) may be provided to a cell, such as margins, fill patterns, etc. Images, line arts or text are examples of typographic objects which may be enclosed by a cell. In an application, such as a spread sheet, these objects may be aligned or justified. The "typographic" area, i.e. the area which the above objects occupy, is based on the attributes of the bonding rules or of the cell, such as the margin attributes, which reserves an area of the cell into which no typographic object may be placed.

Figure 1A:
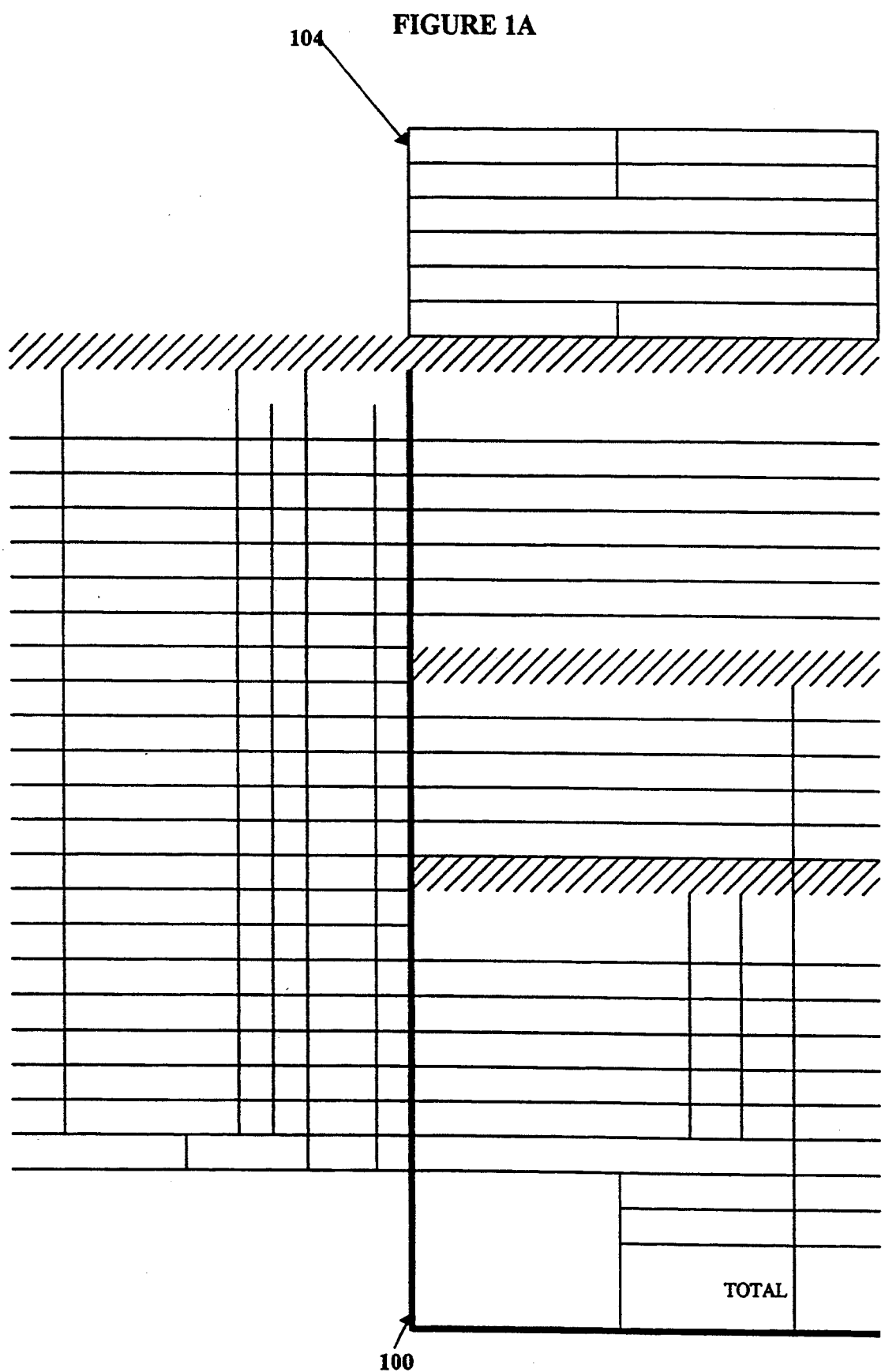
FIG. 1A shows the visible structure a generalized table 100.
Figure 1B:
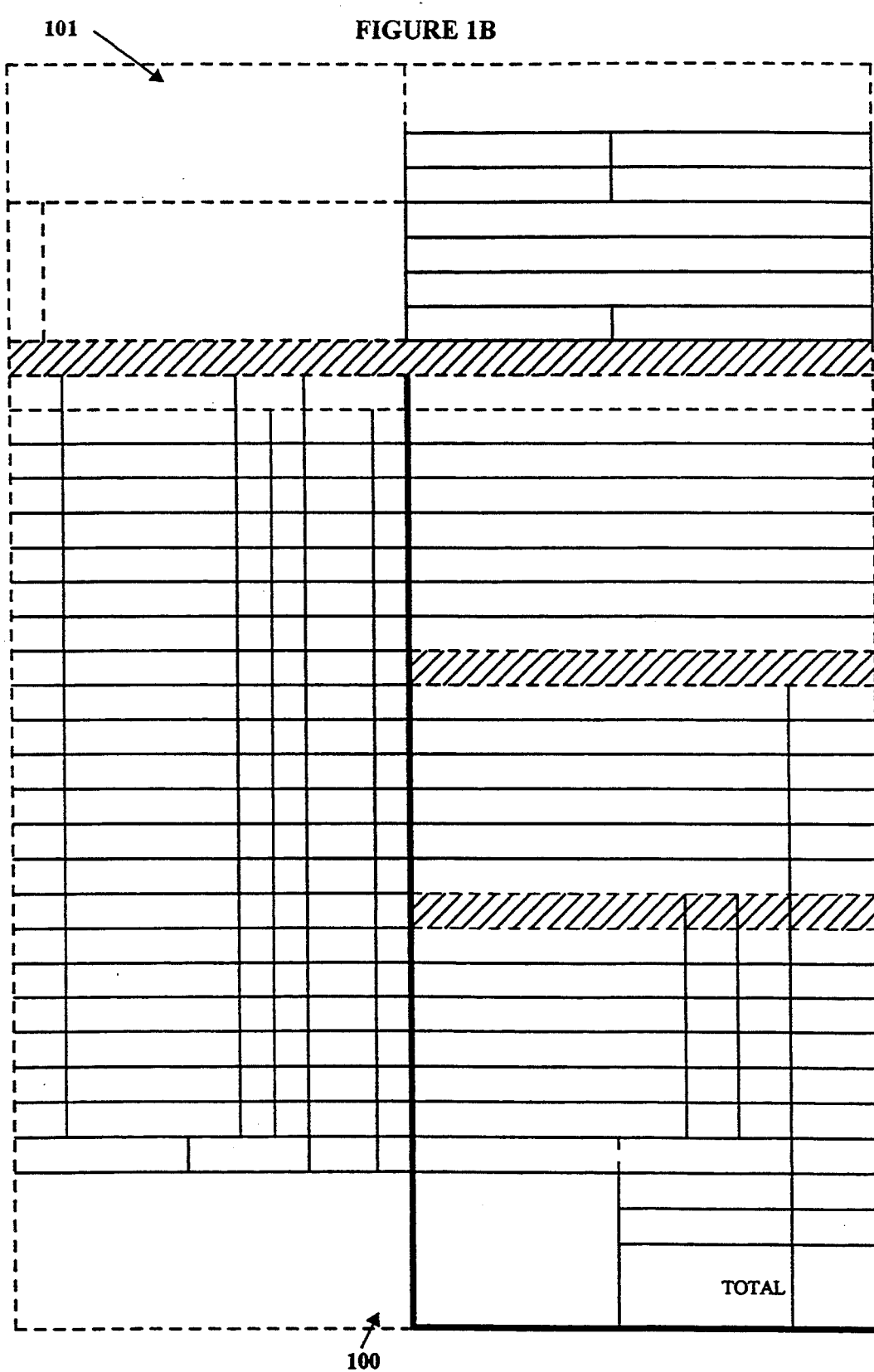
FIG. 1B hows the defined structure of a generalized table 100 of FIG. 1A, including invisible rules which are shown as dotted lines.
Figure 2A:
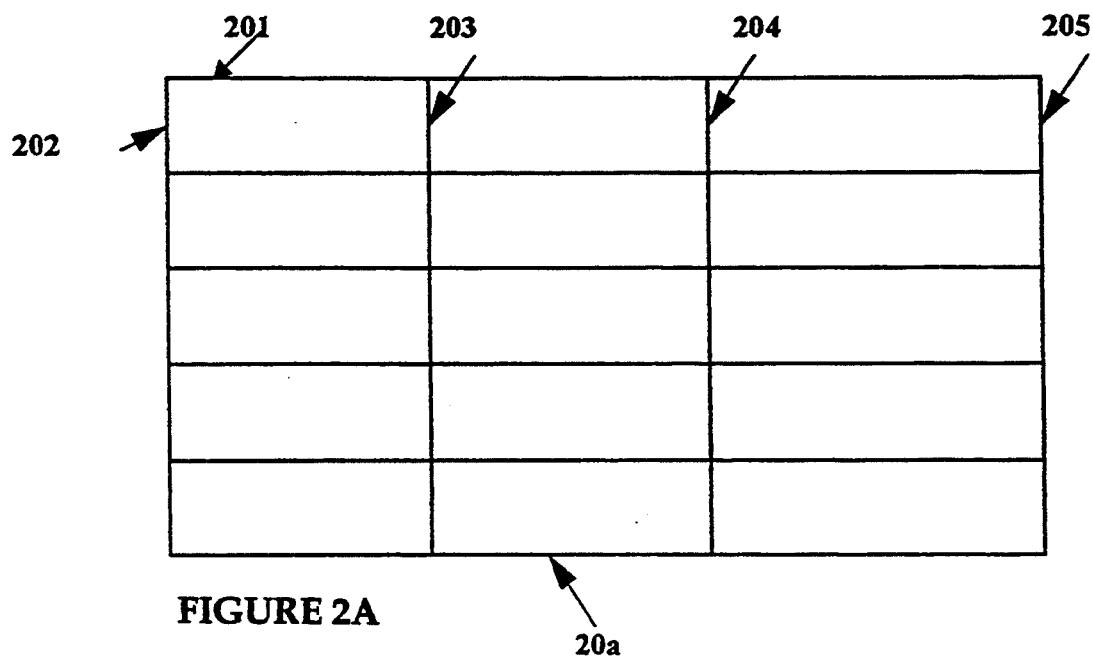
FIG. 2 shows a prior art system using the graphic approach.
Figure 2B:
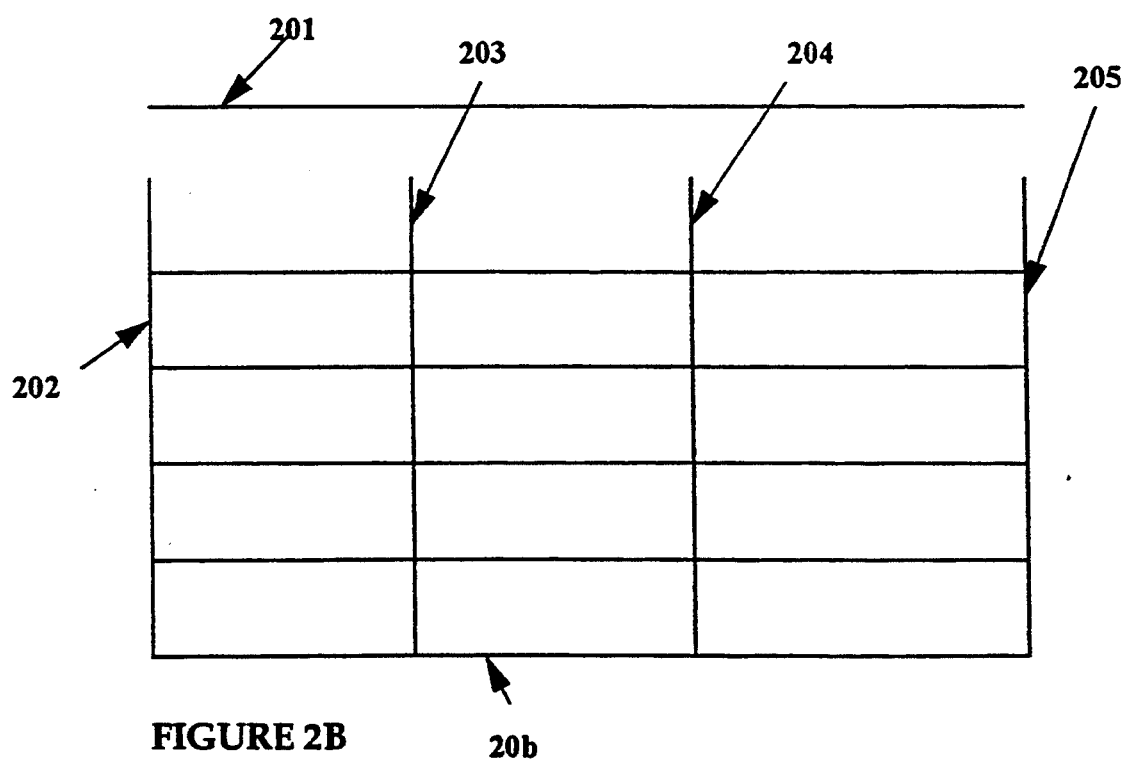
Figure 3A:
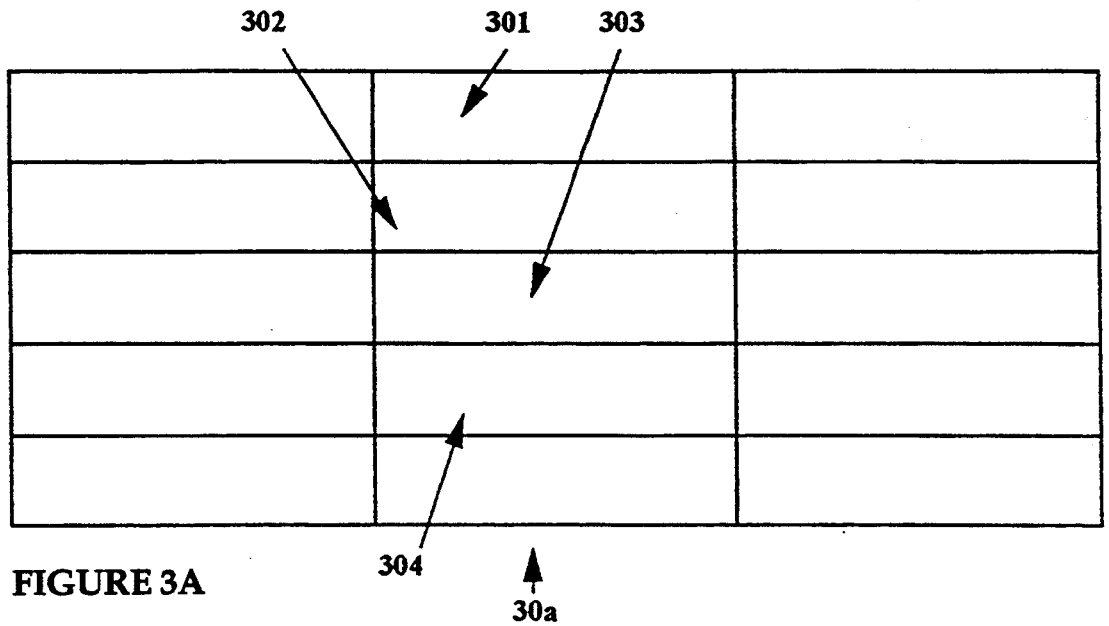
FIG. 3 shows a prior art system using the box approach.
Figure 3B:
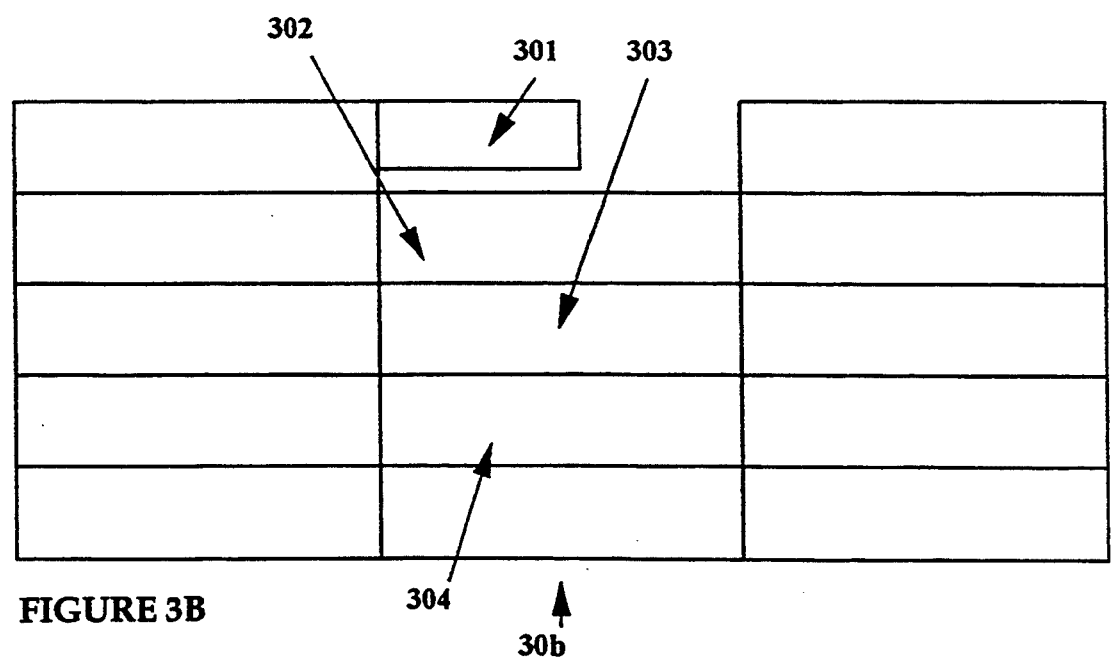

Finally, DATA 605 represents a region as a record comprising four fields: an array "borders" of the rule record type, an array "corners" of numbers, an "around" rule-line record, and a value "fill" of "pattern" type. The pattern data type is a set of numbers, with each number representing a fill pattern. In the present invention, a region is a collection of contiguous cells. Unlike cells, regions are allowed to overlap. Because all cells in a region are contiguous, the region can also be described by its borders. Hence, each region is described by its "borders" field which, like the identically named field in the Cell record type, is an array of rules enclosing the region arranged in the order of clockwise traversal, beginning at the lower left corner of the region. Because the corner of a region is allowed to be rounded (see, for example, corner 104 of FIG. 1A), the "corners" field is an array of radii, with each radius corresponding to the radius of curvature of a corner of the region. The "around" field allows the borders of the region to have a variety of line styles, and the "fill" field specifies the background fill pattern of the region.

In this embodiment, the coordinate system chosen is the 2-dimension Cartesian coordinate system, such that, when shown on display 412, the x-dimension increasing from left to right, and the y-dimension increasing from top to bottom. In FIGS. 8–14, a thickened line segment represents either a selected rule on which to perform an operation or a resulting rule from a selected operation.

Operation to Create A Generalized Table

PROCESS 701 in FIG. 7A creates a generalized table record using two x-coordinates and two y-coordinates. The function "Allocate", when invoked, creates an instance of a data structure by reserving an amount of memory large enough to hold the data structure allocated, and initializes the data structure by assigning predetermined values to the fields of the data structure.

As shown in FIG. 7A, PROCESS 701 first obtains the two x- and the two y-coordinates corresponding to the lower-left and upper-right corners of the generalized table GT1 to be created. PROCESS 701 then allocates, using the function Allocate, all fields of the generalized table record. For example, FIG. 7A shows column and row rule groups CRG1 and RRG1 being allocated. As shown in FIG. 7A, when all the fields of the generalized table record are allocated, the generalized table GT1 is created by another call to the function "Allocate" using the fields CL1, CRG1, CRG2, RRG1 and RRG2 previously allocated.

Operation to Delete a Generalized Table

PROCESS 702 deletes a generalized table. To delete a generalized table record, the records in the fields of the generalized table are first removed and the memory associated with the records in these fields previously allocated should be freed. In systems when memory space is automatically reclaimed ("garbage collection"), records need not be explicitly freed by the process, although so doing will enhance performance. In the Windows environment, however, memory is not automatically reclaimed. The amount of memory occupied by the generalized table is then freed. The "remove" operation of a rule will remove the rule from both its rule group and the generalized table, unless otherwise specified.

An Operation to Draw a Rule

PROCESS 703 shown in FIG. 7B draws a rule. The input data to Process 703 include the generalized table GT1 two points (x1, y1) and (x2, y2), and the drawing mode. If the drawing mode is "column," PROCESS 704, shown in FIG. 7B, is called upon to draw a column rule; otherwise, PROCESS 705, also shown in FIG. 7B, is called upon to draw a row rule.

PROCESS 704 draws a column rule. To create a new column rule CR, Process 704 uses the first point (x1, y1) in the input data of PROCESS 703 to determine whether to create a new column rule group or use an existing column rule group. If the first point (x1, y1) is close to a column rule CR1, the column rule group CRG1 to which the column rule CR1 belongs is chosen. Alternatively, if the first point (x1, y1) is close to the alignment grid of a column rule group CRG2 and the boolean value in alignment_grid field of the column rule group CRG2 indicates that the alignment grid-related operations are activated, the column rule group CRG2 is chosen. In either case, whether the distance between the first point (x1, y1) and a column rule CR1 or between the first point (x1, y1) and the alignment grid of column rule group CRG2 is "close" is a design choice best left to the implementor. Typically, a distance of 2–3 device units is a good choice (A device unit is the minimum unit of resolution in a display device). If the first point (x1, is not close to any existing column rule or alignment grid, then a new column rule group is created with x1 specified at its "pos" field.

Once the column rule group (for this discussion, assuming that it is CRG1) is selected, the y-coordinates of the two points (x1, y1) and (x2, y2) in the input data of PROCESS 703 are used to find the "from" and the "to" row rule groups for the new column rule CR to be created. Beginning at the y-coordinate of the higher point (i.e. the point having as y-coordinate the smaller of y1 and y2, assumed to be y1 for the purpose of this discussion), the new column rule CR is extended in the decreasing y direction until it touches a row rule RR1. The row rule group, say RRG1, of this row rule RR1 will be assigned to the "from" field of the new column rule CR.

Using the y-coordinate of the lower point (i.e., the point having as y-coordinate the larger of y1 and y2, assumed to be y2 for purpose of this example), column rule CR is extended downward (i.e. increasing y direction) in a manner similar to finding RR1 above to find the row rule RR2 which is the first row rule the extended column rule CR will touch. The row rule group of row rule RR2, say RRG2, will be assigned to the "to" field of the column rule N.

With the column rule group CRG1 and two row rule groups, RRG1 and RRG2, the column rule CR is allocated and added to the rule group CRG1. Any portion of a column rule in CRG1 which overlaps the new column rule CR is deleted using PROCESS 724 (FIG. 7K).

In PROCESS 724, a column rule CR1 which overlaps the new column rule CR is split by PROCESS 726 at the positions (i.e., y-coordinates) of RRG1 or RRG2, whichever is applicable, and the overlapping portion of column rule CR1. PROCESS 724 also updates the cells and regions which borders contain the portions of the deleted rules. The borders of these cells regions are updated to contain the new rule CR. Cells divided by the new column rule CR are also updated (i.e., create a new cell record for the extra cell created by an old cell divided in two) accordingly in PROCESS 724.

In FIG. 8, three examples of the column rule drawing operations are illustrated by generalized table pairs 801-802, 803-804 and 805-806. In FIG. 8, a thin solid line represents a rule, a dotted line represents an alignment grid, and a thick solid line represents a new column rule created by PROCESS 704. In table 801 point 1 is selected close to column rule RS2, and point 2 is selected inside the top cell C1. The dotted line in table 803 indicates that the alignment grid mechanism is activated. In accordance to the description provided above, PROCESS 704 draws a new column rule CR, eliminating the column rule RS1, which overlaps column rule CR along RS1's entire length. The portion of the column rule RS2 overlapping the column rule CR is also deleted. The top cell C1 and the cell C2 in the third row are respectively divided into cells C1A and C1B, and cells C2A and C2B, as shown in generalized table 802.

In generalized table 803, point 1 is selected close to an alignment grid A. Accordingly, PROCESS 704 draws the resulting column rule CR, which is shown in generalized table 804. As in generalized table 802, the cell C2 is divided into cells C2A and C2B, which are shown in the resulting generalized table 804. Since the column rule RS1 does not overlap the new column rule CR, RS1 is left intact in generalized table 804. The portion of the column rule RS2 overlapping column rule CR is deleted.

In generalized table 805, even though point 2 is selected close to the column rule RS2, because point 1 is not selected close to any rule, PROCESS 704 creates a new column rule group, in which the new column rule CR is placed. The new column rule CR is shown in generalized table 806.

PROCESS 705 which draws row rules is similar to PROCESS 704 described above. To arrive at PROCESS 705 from PROCESS 704, row rules are exchanged for the column rules, column rules are exchanged for row rules, column rule groups are exchanged for row rule groups, row rule groups are exchanged for column rule groups and x coordinates are exchanged for y coordinates. For brevity, details of PROCESS 705 are omitted, since the person of ordinary skill will be able to derive PROCESS 705 upon consideration of the above description with respect PROCESS 704. In a similar manner, PROCESS 725 (FIG. 7K) which replaces overlapping portions of row rules is analogous to PROCESS 724 used in replacing overlapping portions of column rules. PROCESS 725 is provided by interchanging in PROCESS 724 the row and column rules, and row and column rule groups, as described above for deriving PROCESS 705 from PROCESS 704.

An Operation to Stretch/Shrink a Rule

PROCESS 706, which is shown in FIG. 7C, stretches or shrinks a rule. PROCESS 706 takes as input a rule R1 to be shrunk or stretched, the end END1 of this rule to which to apply the stretch or shrink procedure, and the location of the new end point (x1, y1) of the rule. To achieve the result of a stretched or shrunk rule, one of the processes 707-710 (shown in FIGS. 7D and 7E) is selected to perform the operation, based upon whether the rule is column or row type, and which end of the rule is selected to be stretched or shrunk.

PROCESS 707 stretches or shrinks a column rule CR from its upper end (the end with the smaller y-coordinate). Only the y-coordinate y1 in the new point (x1, y1) is used. If y1 is less than or equal to the current y-coordinate of the column rule CR's upper end, the rule is stretched, otherwise it is shrunk. If the rule CR is stretched, the upper end is first extended upward along its column rule group CRG1 until it reaches y1 of the input point (x1, y1). The column rule CR is then further extended until it touches a row rule RR1. The rule group RG1 of the row RR1 rule is assigned to the "from" field of the rule CR. Just as in the drawing operation described above, any portion of any column rules which overlap the new or extended portion of rule CR is deleted using PROCESS 724, which also updates cells and regions according to changes in their borders or boundaries.

In accordance with PROCESS 707, when a column rule CR is shrunk, its upper end point cannot be relocated to a point having a y-coordinate smaller than the y-coordinate of any row rule RR1 having an end point touching the column rule CR before the shrinkage, unless the row rule RR1 touches other rules in the column rule group CRG after the shrinkage (see the example of the generalized table pair 903-904 described below). Thus, if y1 of the input new point (x1, y1) in selected column rule CR of column rule group CRG is lower than a row rule RR2 of a row rule group RRG and would result in row rule RR2 not touching any other column rules in the column rule group CRG (a condition known as "dangling"), the "pos" field of row rule group RRG will be used as the new y-coordinate of the resulting column rule CR. As described before, PROCESS 724 deletes regions depending on the shrunk portion of the column rule CR and combines cells previously divided by the shrunk portion of column rule CR.

Figures 1, 9A:
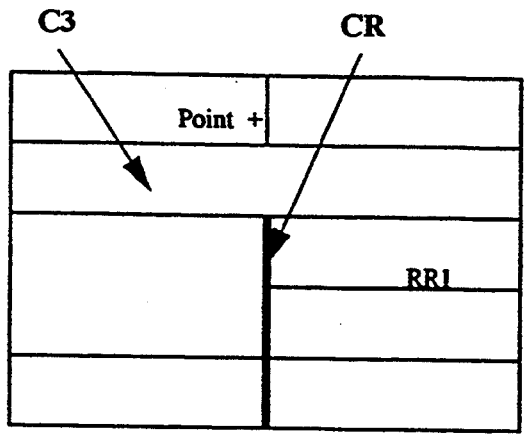
Figures 2, 9A:
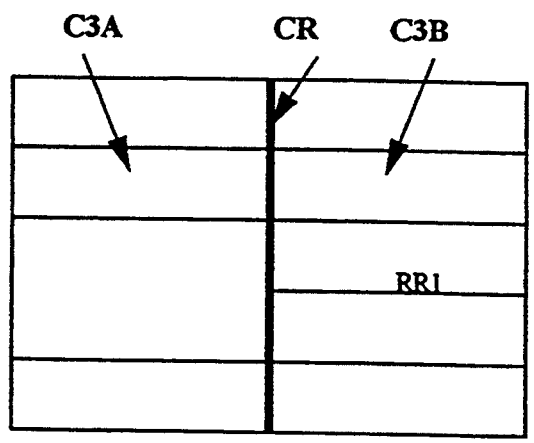
Figures 3, 9A:
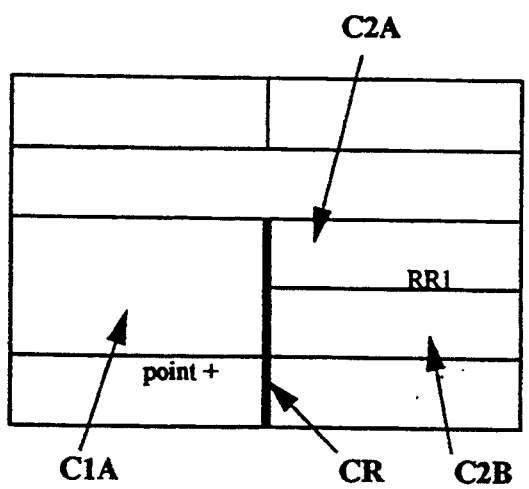
Figures 4, 9A:
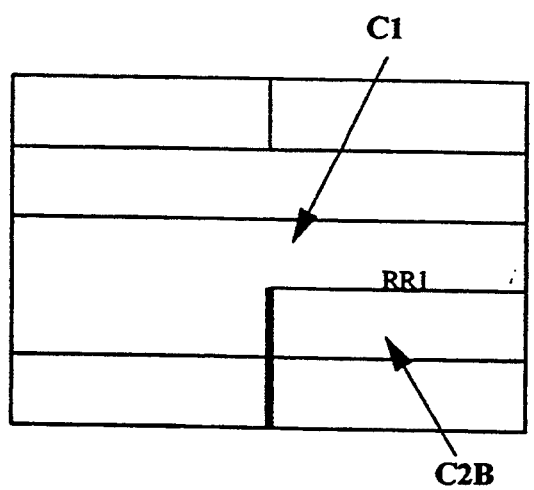
Figure 10A:
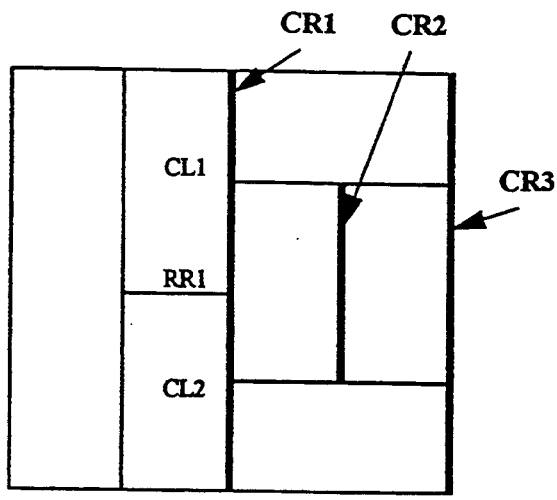
FIG. 10 shows two examples of the operation to shift a group of rules.
Figure 10B:
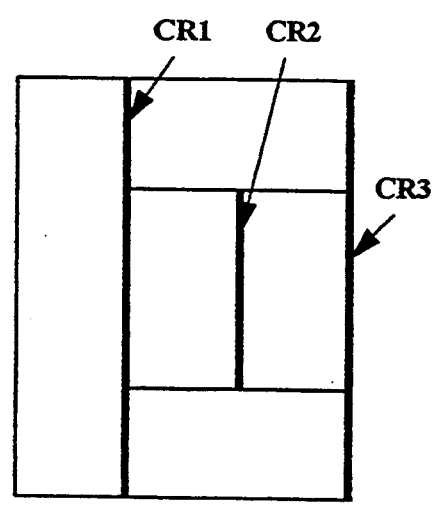
Figure 10C:
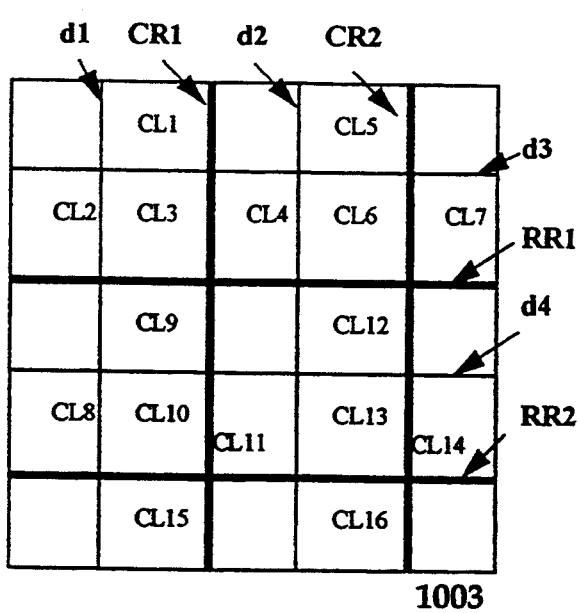
Figure 10D:
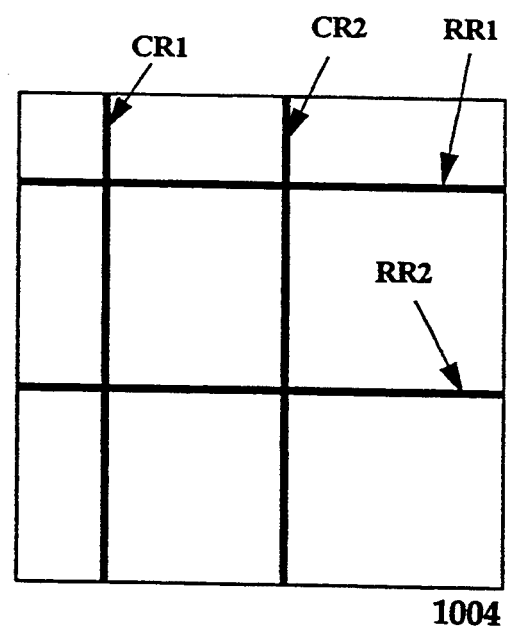
Figure 11A:
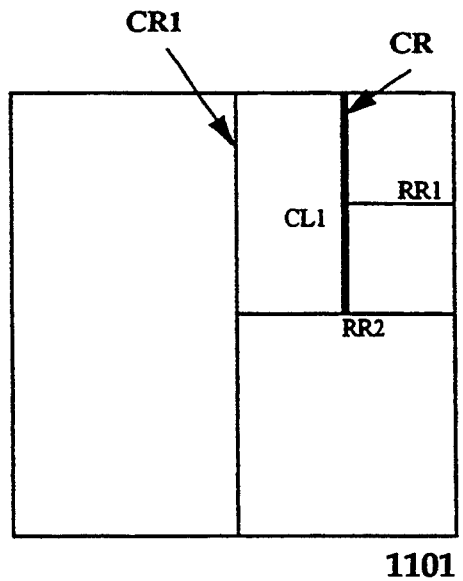
FIG. 11 shows two examples of the operation to shift a column rule.
Figure 11B:
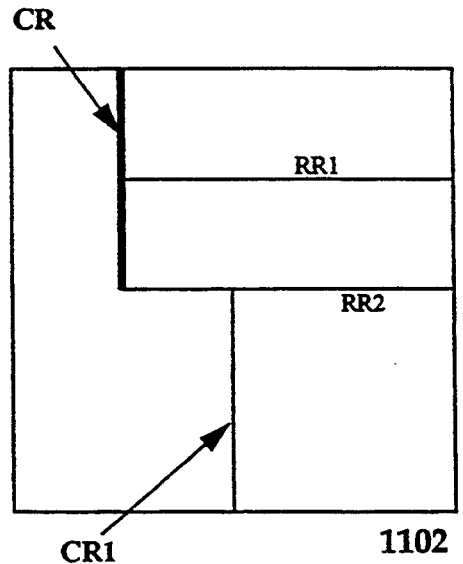
Figure 11C:
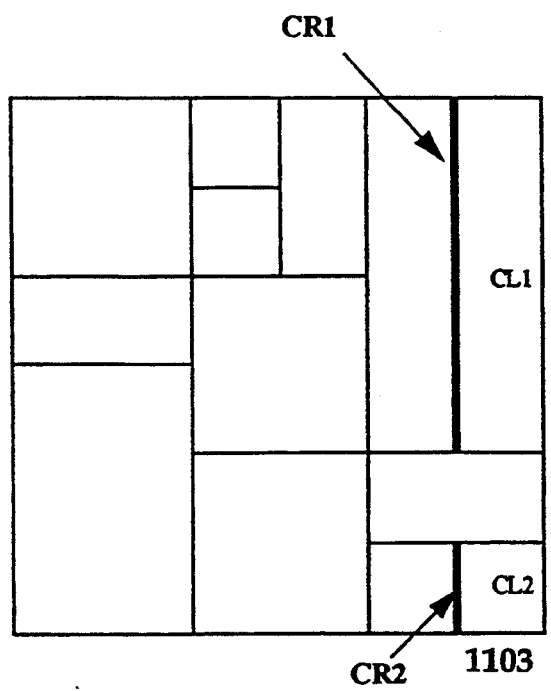
Figure 11D:
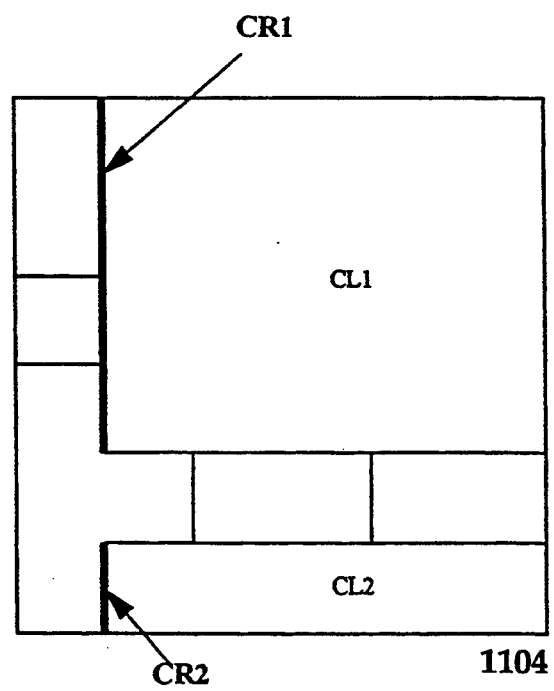
Figure 12A:
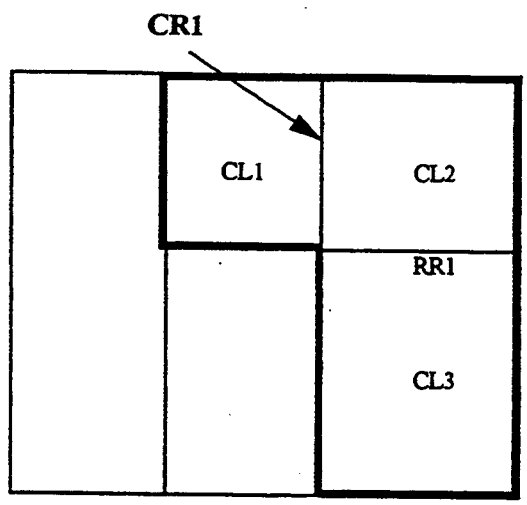
FIG. 12 shows two examples of the operations to combine cells.
Figure 12B:
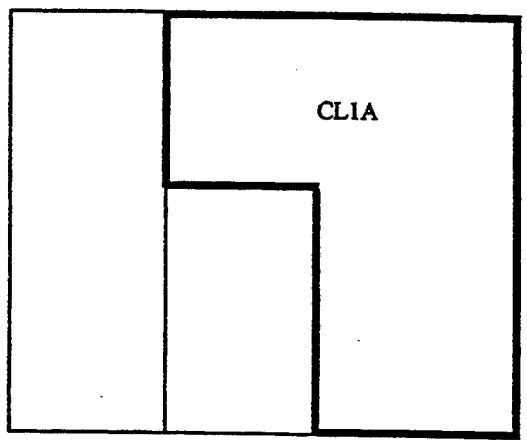
Figure 12C:
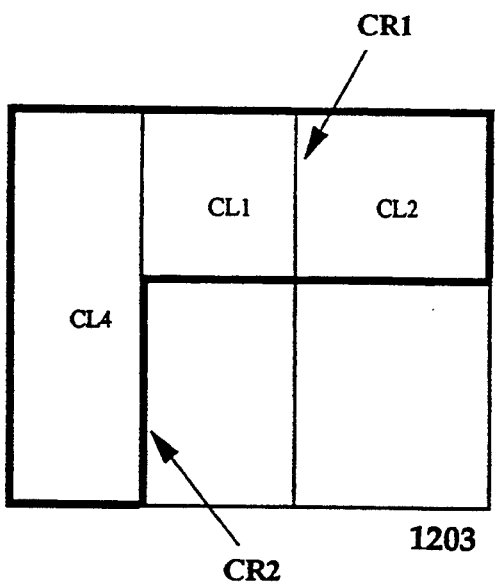
Figure 12D:
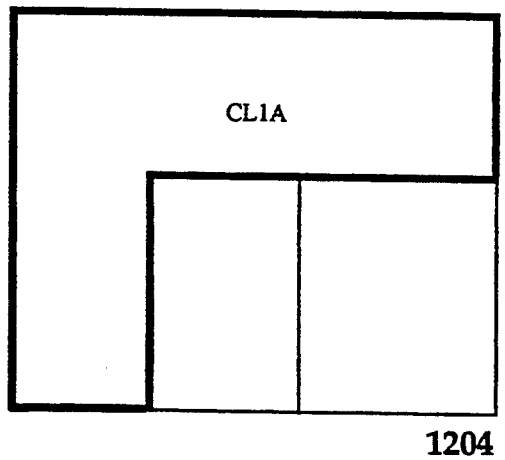

FIG. 9A shows two examples of the column rule stretch or shrink operation in the generalized table pairs 901-902 and 903-904. In FIG. 9A, a thin solid line represents a rule and a thick solid line represents a column rule to be stretched or shrunk. In generalized table 901, the selected point is higher than the upper end of the column rule CR. PROCESS 707 stretches the upper end of the column rule CR as shown in generalized table 902. As a result of stretching column rule CR, cell C3 is divided into cells C3A and C3B, as shown in generalized table 902. In generalized table 903, the point x1, y1 selected is below the upper end of the column rule CR to signal a shrink operation. Because RR1 hangs onto the column rule CR, the upper end point of column rule CR cannot be relocated to a point having a y-coordinate larger than the "pos" field of the row rule group RRG of row rule RR1 and thereby leaving RR1 not touching any column rule in column rule CR's column rule group CRG (i.e., "dangling"). Therefore, PROCESS 707 sets the upper end point of the column rule CR to the point having the y-coordinate equal to the "pos" field of row rule group RRG, as shown in generalized table 904.

The "dangling" problem may also be alternatively solved by, instead of requiring the stretched end point not be to relocated to a point beyond which a dangling situation may arise, providing stretch operations on the "dangled" rules, until all dangled rules are properly extended to eliminate the dangling situation. FIG. 9B shows an embodiment of this alternative solution.

FIG. 9B illustrates one embodiment of this alternative solution using generalized table pair 905-906. Generalized table 905 is a table similar to generalized table 903. Column rule CR of generalized table 905 is selected for a stretch operation, with the selected target stretch point indicated to be just above the row rule RR2. As in generalized table 903, the stretch operation would have left column rule RR1 dangling. However, under this alternative solution, instead of requiring column rule CR to hang onto row rule RR1, as in generalized table 904, column rule CR hangs onto row rule RR2 in generalized table 906. Row rule RR1 is stretched such that its dangling end point now hangs onto column rule CR1, as shown in generalized table 906. Cells C5 and C6 are each combined with a part of cell C4, which is eliminated.

PROCESS 708 stretches or shrinks a column rule from its lower end point. PROCESS 709 stretches or shrinks a row rule from its left end point. and PROCESS 710 stretches or shrinks a row rule from its right end point. Since PROCESSes 708-710 are analogous to PROCESS 707, the detailed description are omitted to avoid undue repetition. The person of ordinary skill will be able to derive PROCESSes 708-710 upon consideration of the above description and drawings related to PROCESS 707.

An Operation to Shift a Set of Rules

PROCESS 711 described in FIG. 7E shifts a specified set of rules. The input data to PROCESS 711 include a specified set of rules, and the distance and direction to be shifted. Because shifting a rule results in all rules in the selected rule's rule group being shifted, the first step is to find all the rule groups to which the specified rules belong. Each rule group is shifted according to its position and according to the direction of shift. For example, if a number of column rule groups are to be shifted to the left (i.e. decreasing x direction), the left-most column rule group (i.e. the row group having the least x-coordinate in its "pos" field) is shifted first. Likewise, if the column rule groups are shifted to the right (i.e. increasing x direction), the right-most column rule group (i.e. the column rule group having the largest x-coordinate) is shifted first. In the same manner, if row rule groups are to be shifted upward (decreasing y direction), the highest one (i.e. the row rule group having the smallest y-coordinate in its "pos" field) is shifted first. Likewise, if the row rule groups are to be shifted downwards (i.e. increasing y direction), the lowest rule group (i.e. the row rule group having largest y-coordinate) is shifted first. If the indicated shift direction is neither the x or y direction, then a combination of an x-direction shift and a y-direction shift is indicated. In this embodiment, the x-direction shift is performed first.

Shifting of each rule group is provided by PROCESSes 712 to 715 of FIGS. 7F and 7G, according to the rule group type and the direction of shift. Before discussing PROCESSes 712-715, the overall effect of shifting multiple rule groups is presented in two Examples shown in FIG. 10.

FIG. 10 shows two examples of the shift operation in generalized table pairs 1001-1002 and 1003-1004. In generalized table 1001, the thick solid lines represent rules to be shifted. The result of shifting these rules is the generalized table 1002. Generalized table 1001 contains three column rules CR1, CR2 and CR3 to be shifted to the left. Because the column rules CR1, CR2 and CR3 are to be shifted left of cells CL1 and CL2 to the left end point of rule RR1, PROCESS 711 deletes cells CL1 and CL2 and the row rule RR1. Assuming row rule RR1 is the only rule in its rule group RRG1, deleting row rule RR1 also deletes the row rule group RRG1. Generalized table 1002 results from this shift of CR1, CR2 and CR3 in generalized table 1001.

Generalized table pair 1003-1004 illustrates the combined effect of shifting upward and to the left a set of rules consisting of two column rules CR1 and CR2, and two row rules RR1 and RR2. As a result of this shift operation, PROCESS 711 deletes cells CL1 to CL16, as shown in table 1004. In this shift operation, PROCESS 711 deletes four rules d1, d2, d3 and d4 and deletes references to these rules in their respective rule groups. The resulting generalized table is generalized table 1004.

PROCESS 712 shifts a column rule group CRG0 to the left. When the column rule group CRG0 is shifted to a new position, the locii of points in CRG0's associated rules sweep over portions of other existing rules and existing cells along the way. The portions of any column rule swept over by rules in column rule group CRG0 are deleted, and the portions of any cell swept over are also reduced in size or deleted, in accordance with the final positions of the rules in the column rule group CRG0. As a result of shifting the rules in column rule group CRG0 to the left, some cells existing before the shift operation may be divided into many cells after the shift operation. Row rules which are completely swept over by the shifting operation are deleted. Row rules which are partially swept over by the shifting operation are reconnected to the final position of column rule group CRG0. Regions which are bounded by borders consisting of rules deleted are deleted also. FIG. 11 shows two examples of shifting a column rule group to the left in generalized table pairs 1101-1102 and 1103-1104. In FIG. 11, a thick line represents a rule CR in the column rule group to be shifted. In generalized table 1101, the column rule CR of column rule group CRG is shifted to the left. PROCESS 712 deletes the portion of the column rule CR1 which is swept over by the shifting column rule CR, and since the entire area of cell CL1 is also swept over, PROCESS 712 also deletes cell CL1. Note that, even after the shift operation, the row rule RR1 remains hanging onto the rule CR and hence the column rule group CRG to which column rule CR belongs. Note, also, that the row rule RR2 is disconnected at its left end from column rule group CRG1 of the column rule CR1, and hangs onto the column rule group CRG of the column rule CR after the shift operation. The resulting generalized table after the shift operation is the generalized table 1102.

Generalized table 1103 is used to illustrate shifting a column rule group CRG having two column rules CR1 and CR2. The result of shift operation, which is evident from the foregoing discussion, is shown as generalized table 1104.

PROCESS 713 shifts a column rule group to the right. PROCESS 714 shifts a row rule group upward. PROCESS 715 shifts a row rule group downward. PROCESSes 713-715 (FIGS. 7F and 7G) are similar to PROCESS 712. Since the person of ordinary skill will be able to derive process 713-715 upon consideration of the above description with respect to PROCESS 712 in conjunction with the accompanying figures, the descriptions of PROCESSes 713-715 are omitted to avoid undue repetition.

An Operation to Delete a Rule

PROCESS 716 (FIG. 7G) deletes a rule. A rule R1 can be deleted only if there exists no other rule R2 which (i) hangs onto the rule group RG1 of the rule R1, (ii) touches the rule R1 and (iii) touches no other rule in the rule group RG1 of rule R1. These conditions are designed so that the deletion operation of rule R1 will not leave the end point of the another rule R2 dangle (i.e. having an end point not connecting to any rule). If a rule R1 is deletable, regions having borders contain the deleted rule R1 are first deleted. Cells previously divided by rule R1 are then combined. Finally, the rule R1 is removed from its rule group RG1. If R1 is the only rule of rule group RG1, PROCESS 716 deletes rule group RG1 also.

An Operation to Align a Rule to a Rule Group

PROCESS 717 (FIG. 7G) aligns a rule R1 of rule group RG0 to a rule group RG. The rule R1 to be aligned must be removed from its current rule group RG0, and shifted to the position of the new rule group RG and then added into the new rule group RG. PROCESS 717 then checks if the newly align R1 overlaps any rules in the rule group RG1. PROCESS 717 then deletes the portions of the rules overlapping rule R1 using PROCESS 717.

An Operation to Unalign a Rule

PROCESS 718 (FIG. 7H) removes a rule R1 from its rule group RG0. PROCESS 718 may be used in the alignment-removing step discussed in PROCESS 717. A new rule group RG is created at the same position of RG0, as indicated by the "pos" field RG0. (Obviously, RG does not containing any rule when created). Then the rule R1 is removed from rule group RG0 and inserted into the new rule group RG.

An Operation to Combine Cells

PROCESS 719 (FIG. 7H) combines cells located contiguously in a specified area. Each area is specified in the same way as when specifying a region, i.e., either by specifying the borders enclosing the area, or by specifying the cells included in the area. PROCESS 719 deletes all rules and all portions of rules lying inside the area. PROCESS 719 also deletes all regions containing the deleted rules. FIG. 12 shows two examples of cells being combined using generalized table pairs 1201-1202 and 1203-1204. In generalized table 1201, the area inside thick lines are to be combined. Cells CL1, CL2 and CL3 are replaced by a new cell CL1A, and portions of rules CR1 and RR1 that lie inside the area are deleted, as shown in generalized table 1202. In generalized table 1203, when the area inside thick lines are combined, cells CL1, CL2, CL4 are replaced by cell CL1A, and rules CR1 and CR2 are adjusted accordingly, as shown in generalized table 1204.

An Operation to Divide Cells

PROCESS 720 (FIG. 7I) divides cells located contiguously in a specified rectangular area into a number of columns and a number of rows of cells. If the area already encloses more than one column, PROCESS 720 will not create new columns. Similarly, if the area encloses more than one row, PROCESS 720 will also not create more rows. If the area is a cell, PROCESS 720 divides the area into equal dimension of columns and rows of cells based on the dimensions of its bounding rectangle. FIG. 13 shows two examples of cells being divided using generalized table pairs 1301-1302, and 1303-1304. In generalized table 1301, the area including cells CL1, CL2 and CL3 and bounded by the thick rules is divided. Since cells CL1, CL2 and CL3 are in a row, the area can only be divided into more rows. After the area is divided into three rows, each row is then divided into three cells and two rules R1 and R2 are inserted to separate the newly created cells, as shown in generalized table 1302. In generalized table 1303, since only one cell CL1 is to be divided, it can be divided into both columns and rows. Generalized table 1304 shows the cell CL1 of table 1303 being divided into two columns and three rows, and one column rule R5 and two row rules R3 and R4 are inserted.

An Operation to Create a Region

PROCESS 721 (FIG. 7I) creates a region. A region can be created either by specifying the set of rules that enclose the region, or the area enclosing contiguously located cells. If the region is specified by the area enclosing contiguously located cells, the outer borders of the specified area, which are a set of rules, are used as the rules enclosing the region. With the set of rules specified, a region is allocated and added to the generalized table. FIG. 14 shows two examples of regions being created using generalized table pairs 1401-1402 and 1403-1404. In generalized table 1401, the area bounded by the thick rules is used to create a region. The resulting region is shown as the shaded area in generalized table 1402. The area bounded by thick lines in generalized table 1403 is used to create a region shown in generalized table 1404 as the shaded area.

An Operation to Delete a Region

PROCESS 722 (FIG. 7J) deletes a region. PROCESS 722 removes the specified region RGN from the generalized table GT1 and deletes the data structure of the region. FIG. 14 is also used to provide two examples of regions being deleted. In generalized table 1402, a region shown as the shaded area is deleted. The result is shown as generalized table 1401. In generalized table 1404, a region shown as the shaded area is deleted and the result is shown as generalized table 1403.

An Operation to Set Alignment Grid of A Rule Group

PROCESS 723 (FIG. 7J) turns on or off the alignment grid of a rule group. It sets the alignment grid of the specified rule group to a specified value.

Some other Processes

As discussed previously, PROCESS 724 (FIG. 7K) replaces with a new rule CR existing rules or portions of rules in a column rule group CRG situated between two row rule groups RRG1 and RRG2, where the rule CR extends from a row rule in row rule group RRG1 to a row rule in row rule group RRG2. If a portion of an existing rule exists between the two row rule groups and overlaps the new column rule CR, the existing rule is split at the point of overlap and the overlapping portion deleted. PROCESS 724 deletes any existing rule extending completely between the two rule groups RRG1 and RRG2. PROCESS 724 also updates with the new column rule CR borders of cells and regions containing the deleted rules. PROCESS 724 updates cells that are divided by the new rule CR with the new cell borders, and creates the cells divided out.

As discussed above, PROCESS 725 (FIG. 7K) is analogous to PROCESS 724 in that roles of row and column rules are reversed. For the sake of brevity, PROCESS 725 is not discussed in detail. PROCESS 726 (FIG. 7L) splits a column rule CR at the position specified by the "pos" field of a row rule group RRG. PROCESS 726 assumes a row rule RR in the row rule group PG which touches the column rule CR. PROCESS 726 split the column rule CR at the specified position into two rules CR1 and CR2. All cells and regions containing as border the original rule CR1 are updated to contain either new rules CR1 or CR2.

For brevity also, PROCESS 727 (FIG. 7L) is not discussed in detail. PROCESS 727 is analogous to PROCESS 726 in that it splits a row rule, rather than a column rule, at a column rule group, rather than a row rule group.

CONCLUSION

In accordance with the present invention, a number of operations are provided to create and to modify a generalized table. The generalized table is useful in many business forms, documents and user interfaces of software systems.

The above description is intended to illustrate the specific embodiments of the present invention and not intended to be limiting. The person of ordinary skill in the art will be able to derive numerous modifications and variations within the scope of the present invention as defined in the following claims.

I claim:

1. In a computer, a system for designing a form system, said system executing a set of commands for creating and modifying said form system and displaying said form system ill a peripheral device of the computer on a 2-dimensional plane having x- and y-coordinates, said system comprising:

means for creating a plurality of column rules, each column rule having first and second end points of the same x-coordinate;

means for creating a plurality of row rules, each row rule having first and second end points of the same y-coordinate, each of said first and second end points of each row rule having the same x-coordinate as the x-coordinate of an end point of at least one column rule within said plurality of column rules, and each of said first and second end points of each column rule having the same y-coordinate of an end point of at least one row rule within said plurality of row rules;

means for creating one or more cells in said form structure, each cell bordered by column and row rules of said pluralities of column and row rules;

means for modifying said plurality of row rules, said plurality of column rules, and said one or more cells in accordance with said set of commands;

means for displaying said form system on said 2-dimensional plane, in accordance with said set of commands;

means for creating one or more row rule groups, each row rule group including one or more row rules of said plurality of row rules, each row rule in each row rule group having the same y-coordinate, and each row rule within said plurality of row rules being included in one and only one row rule group;

means for creating one or more column rule groups each column rule group including one or more column rules of said plurality of column rules, each column rule in each column rule group having the same x-coordinate, and each column rule within said plurality of column rules being included in one and only one column rule group;

means for receiving an x-coordinate and a y-coordinate, said x-coordinate and said y-coordinate defining a location on said 2-dimensional plane; and means for identifying a rule group using said location, wherein if said location is within a predetermined distance of a rule, the rule group which included said rule is identified, and if said location is not within a predetermined distance of a rule, a new rule group is created and identified.

2. In a computer, a system for designing a form structure, said system executing a set of commands for creating and modifying said form system and displaying said form structure in a peripheral device of the computer on a 2-dimensional plane having x- and y-coordinates, said system comprising:

means or creating a plurality of column rules, each column rule having first and second end points of the same x-coordinate;

means for creating a plurality of row rules, each row rule having first and second end points of the same y-coordinate, each of said first and second end points of each row rule having the same x-coordinate as the x-coordinate of an end point of at least one column rule within said plurality of column rules, and each of said first and second end points of each column rule having the same y-coordinate of an end point of at least one row rule within said plurality of row rules;

means for creating one or more cells in said form system, each cell bordered by column and row rules of said pluralities of column and row rules;

means for modifying said plurality of row rules, said plurality of column rules, and said one or more cells, in accordance with said set of commands;

means for displaying said form system on said 2-dimensional plane, in accordance with said set of commands;

means for creating one or more row rule groups, each row rule group including one or more row rules of said plurality of row rules, each row rule in each row rule group having the same y-coordinate, and each row rule within said plurality of row rules being included in one and only one row rule group;

means for creating one or more column rule groups each column rule group including one or more column rules of said plurality of column rules, each column rule in each column rule group having the same x-coordinate, and each column rule within said plurality of column rules being included in one and only one column rule group;

means for receiving as input an x-coordinate and a y-coordinate, said x-coordinate and said y-coordinate defining a location on said 2-dimensional plane;

means for receiving as input a signal indicating whether an alignment grid is activated; and means for identifying a rule group using said location and said signal, wherein (i) if said location is within a predetermined distance of a rule, the rule group which included said rule is identified, (ii) if said location is not within a predetermined distance of a rule, but within a predetermined distance of a rule group, and said alignment grid is activated, said rule group is identified, and (iii) if said alignment grid is activated, and said location is neither within a predetermined distance of a rule, nor within said predetermined distance of a rule group, a new rule group is created and identified.

3. In a computer, a system for designing a form system, said system executing a set of commands for creating and modifying said form system and displaying said form system in a peripheral device of the computer on a 2-dimensional plane having x- and y-coordinates, said system comprising:

means for creating a plurality of column rules, each column rule having first and second end points of the same x-coordinate;

means for creating a plurality of row rules, each row rule having first and second end points of the same y-coordinate, each of said first and second end points of each row rule having the same x-coordinate as the x-coordinate of an end point of at least one column rule within said plurality of column rules, and each of said first and second end points of each column rule having the same y-coordinate of an end point of at least one row rule within said plurality of row rules;

means for creating one or more cells in said form system, each cell bordered by column and row rules of said pluralities of column and row rules;

means for modifying said plurality of row rules, said plurality of column rules, and said one or more cells, in accordance with said set of commands;

means for displaying said form system on said 2-dimensional plane, in accordance with said set of commands;

means for creating one or more row rule groups, each row rule group including one or more row rules of said plurality of row rules, each row rule in each row rule group having the same y-coordinate, and each row rule within said plurality of row rules being included in one and only one row rule group;

means sot creating one or more column rule groups, each column rule group including one or more column rules of said plurality of column rules, each column rule in each column rule group having the same x-coordinate, and each column rule within said plurality of column rules being included in one and only one column rule group;

means for receiving as input an x-coordinate and a y-coordinate, said x-coordinate and said y-coordinate defining a location on said 2-dimensional plane;

means for receiving as input a signal indicating whether an alignment grid is activated; and means for identifying a rule group using said location and said signal, wherein (i) if said location is a predetermined distance of a rule group, and said alignment grid is activated, said rule group is identified, (ii) if said location is not within a predetermined distance of a rule group, but within a predetermined distance of a rule, the rule group which included said rule is identified, and (iii) if said alignment grid is activated and said location is neither within a predetermined distance of a rule, nor within said predetermined distance of a rule group, a new rule group is created and identified.

4. In a computer, a system for designing a form structure, said system executing a set of commands for creating and modifying said form system and displaying said form structure in a peripheral device of the computer on a 2-dimensional plane having x- and y-coordinates, said system comprising:

means for creating a plurality of column rules, each column rule having first and second end points of the same x-coordinate;

means for creating a plurality of row rules each rule having first and second end points of the same y-coordinate, each of said first and second end points each row rule having the same x-coordinate as the x-coordinate of an end point of at least one column within said plurality of column rules, and each of said first and second end points of each column rule having the same y-coordinate of an end point of at least on row rule within said plurality of row rules;

means for creating one or more cells in said form structure, each cell bordered by column and row rules of said pluralities of column and row rules;

means for modifying said plurality of row rules, said plurality of column rules, and said one or more cells, in accordance with said set of commands;

means for displaying said form structure on said 2-dimensional plane, in accordance with said set of commands;

means for creating one or more row rule groups, each row rule group including one or more row rules of said plurality of row rules, each row rule in each row rule group having the same y-coordinate, and each row rule within said plurality of row rues being included in one and only one row rule group;

means or creating one or more column rule groups, each column rule group including one or more column rules of said plurality of column rules, each column rule in each column rule group having the same x-coordinate, and each column rule within said plurality of column rules being included in one and only one column rule group; and means for creating a hanging relationship between an end point of a first rule and a second rule, such that said end point of said first rule imposes a requirement of lying on said second rule, and wherein if said first rule is a column rule, then said second rule is a row rule, and if said first rule is a row rule, then said second rule is a column rule.

5. A system as in claim 4, further comprising means for shifting a rule group a directed distance said shift creating one or more areas defined by the loci of points in the one or more rules within said rule group shifted said directed distance.

6. A system as in claim 5, further comprising means for eliminating, said means for eliminating eliminates, when a rule overlaps said areas, from said rule a portion of said rule overlapping said areas.

7. A system as in claim 5, further comprising means for maintaining hanging relationships wherein a first collection of rules being rules having end points hanging onto a shifted rule before said shift, are extended or shrunk so as to maintain the requirements created by said means for creating a hanging relationship.

8. A system as in claim 7, wherein said means for maintaining hanging relationship further creates hanging relationships after said shift between said shifted rule group and a second collection of rules, said second collection of rules being rules having end points hanging onto a portion of a rule eliminated by said means for eliminating as a result of said shift, each rule within said second collection of rules being extended or shrunk, so as to establish a requirement that the endpoint of said second collection rule lie on said selected rule.

9. A system as in claim 5, further comprising means for eliminating cells located entirely within said areas, and for resizing cells partly overlapping said areas before said shift, by eliminating from said cells those portions of said cells overlapping said areas.

10. A system as in claim 5, wherein when said directed distance is along neither the x-direction nor the y-direction, said shift is a combination of a shift along the x-direction and a shift along the y-direction.

11. A system as in claim 5, further comprising means for shifting multiple rule groups by a directed distance, said means for shifting multiple rule groups applies said means for shifting a rule group on said multiple rule groups, one rule group at a time and in a predetermined order.

12. A system as in claim 11, wherein said means for shifting multiple rule groups shifts said multiple rule groups such that:
  (i) if said shift includes a shift in the decreasing x-direction, the x-coordinate of each of said multiple rule groups, beginning with the rule group having the least x-coordinate;
  (ii) if said shift includes a shift in the increasing x-direction, the x-coordinate of each of said multiple rule groups, beginning with the rule group having the greatest x-coordinate;
  (ii) if said shift includes a shift in the decreasing y-direction, the y-coordinate of each of said multiple rule groups, beginning with the rule group having the least y-coordinate; and
  (iv) if said shift includes a shift in the increasing y-direction, the y-coordinate of each of said multiple rule groups, beginning with the rule group having the greatest y-coordinate.

13. In a computer, a system for designing a form structure, said system executing a set of commands for creating and modifying said form structure and displaying said form structure in a peripheral device of the computer on a 2-dimensional plane having x- and y-coordinates, said system comprising:

means for creating a plurality of column rules, each column rule having first and second end points of the same x-coordinate;

means sot creating a plurality of row rules, each row rule having first and second end points of the same y-coordinate, each of said first and second end points of each row rule having the same x-coordinate as the x-coordinate of an end point of at least one column rule within said plurality of column rules, and each of said first and second end points of each column rule having the same y-coordinate of an end point of at least one row rule within said plurality of row rules;

means for creating one or more cells in said form system, each cell bordered by column and row rules of said pluralities of column and row rules;

means for modifying said plurality of row rules said plurality of column rules, and said one or more cells, in accordance with said set of commands;

means for displaying said form system on said 2-dimensional plane, in accordance with said set of commands;

means for creating one or more row rule groups, each row rule group including one or more row rules of said plurality of row rules, each row rule in each row rule group having the same y-coordinate, and each row rule within said plurality of row rules being included in one and only one row rule group;

means for creating one or more column rule groups, each column rule group including one or more column rules of said plurality of column rules, each column rule in each column rule group having the same x-coordinate, and each column rule within said plurality of column rules being included in one and only one column rule group:

means for receiving as input an identification of a rule group, and means for receiving as inputs first and second coordinates, said first and second coordinates being y-coordinates when said rule group is a column rule group, and said first and second coordinates being x-coordinates when said rule group is a row rule group; and means for creating a new rule based on whether said rule group is a column rule group or a row rule group, and also on values of said first and second coordinates, wherein
  (i) if said rule group is a column rule group, said new rule is created as a column rule and added to said rule group, said new rule extending from a point within a first row rule intersecting said new rule, said first row rule being the intersecting row rule having the greatest y-coordinate which is less than or equal to the lesser of said first and second coordinates, to a point within a second row rule intersecting said new rule, said second row rule being the intersecting row rule having the least y-coordinate which is greater than or equal to the greater of said first and second coordinates; and (ii) if said rule group is a row rule group, said new rule is created as a row rule and added to said rule group, said new rule extending from a point within a first column rule intersecting said new rule, said first column rule being the intersecting column rule having the greatest x-coordinate which is less than or equal to the lesser of said first and second coordinates, to a point within a second column rule intersecting said new rule, said second column rule being the intersecting column rule having the least x-coordinate which is greater than or equal to the greater of said first and second coordinates.

14. A system as in claim 13, further comprising:
first means for eliminating, said first means for eliminating
(i) detecting a row rule overlap condition in which two row rules of a row rule group overlap each other and
(ii) eliminating, when such row rule overlap condition is detected, from one of said overlapping row rules the portion of said row rule which overlaps the other one of said overlapping row rules, and
second means for eliminating, said second means or eliminating
(i) detecting a column rule overlap condition in which two column rules of a column rule group overlap each other and
(ii) eliminating, when said column rule overlap condition is detected, from one of said column rules a portion of said column rule which overlaps the other one of said overlapping column rules.

15. In a computer, a system for designing a form system, said system executing a set of commands for creating and modifying said form system and displaying said form system in a peripheral device of the computer on a 2-dimensional plane having x- and y-coordinates, said system comprising:
means for creating a plurality of column rules, each column rule having first and second end points of the same x-coordinate;
means or creating a plurality of row rules, each row rule having first and second end points of the same y-coordinate, each of said first and second end points of each row rule having the same x-coordinate as the x-coordinate of an end point of at least one column rule within said plurality of column rules, and each of said first and second end points of each column rule having the same y-coordinate of an end point of at least one row rule within said plurality of row rules;
means for creating one or more cells in said form system, each cell bordered by column and row rules of said plurality of column and row rules;
means for modifying said plurality of row rules, said plurality of column rules, and said one or more cells, in accordance with said set of commands;
means for displaying said form structure on said 2-dimensional plane, in accordance with said set of commands;

means for creating one or more row rule groups, each row rule group including one or more row rules of said plurality of row rules, each row rule in each [9rule group having the same y-coordinate, and each row rules within said plurality of row rules being included in one and only one row rule group;
means for creating one or more column rule groups, each column rule group including one or more columns of said plurality of column rules, each column rule in each column rule group having the same x-coordinate, and each column rule within said plurality of column rule being included in one and only one column rule group;
first means for eliminating, said first means for eliminating
(i) detecting a row rule overlap condition in which two row rules of a row rule group overlap each other, and
(ii) eliminating, when said row rule overlap condition is detected, from one of said overlapping row rules a portion of said row rule which overlaps the other one of said overlapping row rules, and
second means for eliminating, said second means for eliminating
(i) detecting a column rule overlap condition in which two column rules overlap each other, and
(ii) eliminating, when said column rule overlap condition is detected, from one of said overlapping column rules a portion of said column rule which overlaps the other one of said overlapping column rules.

16. In a computer, a system for designing form structure, said system executing a set of commands for creating and modifying said form structure and displaying said form structure in a peripheral device of the computer on a 2-dimensional plane having x- and y-coordinates, said system comprising:
means or creating a plurality of column rules, each column rule having first and second end points of the same x-coordinate;
means for creating a plurality of row rules each row rule having first and second end points of the same y-coordinate, each of said first and second end points of each row rule having the same X-coordinate as the x-coordinate of an end point of at least one column rule within said plurality of column rules, and each of said first and second end points of each column rule having the same y-coordinate of an end point of at least one row rule within said plurality of row rules;
means for creating one or more cells in said form system, each cell bordered by column and row rules of said pluralities of column and row rules;
means for modifying said plurality of row rules, said plurality of column rules, and said one or more cells, in accordance with said set of commands;
means or displaying said form system on said 2-dimensional plane, in accordance with said set of commands;
means for creating one or more row rule groups, each row rule group including one or more row rules of said plurality of row rules, each row rule in each row rule group having the same y-coordinate, and each row rule within said plurality of row rules being included in one and only one row rule group;
means for creating one or more column rule groups each column rule group including one or more column rule of said plurality of column rules, each column rule in each column rule group having the same x-coordinate, an each column rule within said plurality of column rules being included in one and only one column rule group; and means for changing the length of a designated rule, wherein said means for changing moves a designated end point of said designated rule according to a specified location, wherein:

(i) if said designated rule is a column rule, and said designated end point is the end point of said designated rule having the greater y-coordinate, the length of said designated rule is changed by relocating said designated end point to intersect the row rule having the least y-coordinate which is greater than or equal to the y-coordinate of said specified location, without causing a row rule which touches said designated rule prior to said relocation to become not touching a column rule within the column rule group of said designated rule after said relocation;

(ii) if said designated rule is a column rule, and said designated end point is the end point of said designated rule having the lesser y-coordinate, the length of said designated rule is changed by relocating said designated end point to intersect the row rule having the greatest y-coordinate which is less than or equal to the y-coordinate of said specified location, without causing a row rule which touches said designated rule prior to said relocation to become not touching a column rule within the column rule group of said designated rule after said relocation;

(iii) if said designated rule is a row rule, and said designated end point is the end point of said designated rule having the greater x-coordinate, the length of said designated rule is changed by relocating said designated end point to intersect the column rule having the least x-coordinate which is greater than or equal to the x-coordinate of said specified location, without causing a column rule which touches said designated rule prior to said relocation to become not touching a row rule within the row rule group of said designated rule after said relocation; and (iv) if said designated rule is a row rule, and said designated end point is the end point of said designated rule having the lesser x-coordinate, the length of said designated rule is changed by relocating said designated end point to intersect the row rule having the greatest x-coordinate which is less than or equal to the x-coordinate of said specified location, without causing a column rule which touches said designated rule prior to said relocation to become not touching a row rule within the row rule group of said designated rule after said relocation.

17. In a computer, a system for designing a form structure, said system executing a set of commands for creating and modifying said form structure and displaying said form structure in a peripheral device of the computer on a 2-dimensional plane having x- and y-coordinates, said system comprising:

means for creating a plurality of column rules, each column rule having first and second end points of the same x-coordinate;

means for creating a plurality of row rules, each row rule having first and second end points of the same y-coordinate, each of said first and second end points of each row rule having the same x-coordinate as the x-coordinate of an end point of at least one column rule within said plurality of column rules, and each of said first and second end points of each column rule having the same y-coordinate of an end point of at least one row rule within said plurality of row rules;

means for creating one or more cells in said form system, each cell bordered by column and row rules of said pluralities of column and row rules;

means for modifying said plurality of row rules, said plurality of column rules, and said one or more cells, in accordance with said set of commands;

means for displaying said form system on said 2-dimensional plane, in accordance with said set of commands;

means for creating one or more row rule groups, each row rule group including one or more row rules of said plurality of row rules, each row rule in each row rule group having the same y-coordinate, and each row rule within said plurality of row rules being included in one and only one row rule group:

means for creating one or more column rule groups, each column rule group including one or more column rules of said plurality of column rules, each column rule in each column rule group having the same x-coordinate, and each column rule within said plurality of column rules being included in one and only one column rule group; and means for changing the length of a designated rule, wherein said means for changing moves a designated end point of said designated rule according to a specified location, wherein:

(i) if said designated rule is a column rule, and said designated end point is the end point of said designated rule having the greater y-coordinate,
   (a) the length of said designated rule is changed by relocating said designated end point to intersect the row rule having the least y-coordinate which is greater than or equal to the y-coordinate of said specified location, and
   (b) the end point of a row rule, which lies on said designated rule prior to said relocation and which does not lie on a column rule within the column rule group of said designated rule after said relocation, is relocated in the direction of increasing length of said row rule to intersect a column rule;

(ii) if said designated rule is a column rule, and said designated end point is the end point of said designated rule having the lesser y-coordinate,
   (a) the length of said designated rule is changed by relocating said designated end point to intersect the row rule having the greatest y-coordinate which is less than or equal to the y-coordinate of said specified location, and
   (b) the end point of a row rule, which lies on said designated rule prior to said relocation and which does not lie on a row rule within the column rule group of said designated rule after said relocation, is relocated in the direction of increasing length of said row rule to intersect a column rule;

(iii) if said designated rule is a row rule, and said designated end point is the end point of said designated rule having the greater x-coordinate, (a) the length of said designated rule is changed by relocating said designated end point to intersect the column rule having the least x-coordinate which is greater than or equal to the x-coordinate of said specified location, and (b) the end point of a column rule, which lies on said designated rule prior to said relocation and which does not lie on a row rule within the row rule group of said designated rule after said relocation, is relocated in the direction of increasing length of said column rule to intersect a row rule; and (iv) if said designated rule is a row rule, and said designated end point is the end point of said designated rule having the lesser x-coordinate, (a) the length of said designated rule is changed by relocating said designated end point to intersect the column rule having the greatest x-coordinate which is less than or equal to the x-coordinate of said specified location, and (b) the end point of a column rule, which lies on said designated rule prior to said relocation and which does not lie on a row rule within the row rule group of said designated rule after said relocation, is relocated in the direction of increasing length of said column rule to intersect a row rule.

18. In a computer, a method for designing a form structure, said form structure being drawn on a 2-dimensional plane represented by x- and y-coordinates comprising the steps of:

providing a plurality of column rules wherein each column rule having first and second end points of the same x-coordinate;

providing a plurality of row rules wherein each row rule having first and second end points of the same y-coordinate, each of said first and second end points of each row rule has the same x-coordinate as the x-coordinate of an end point of at least one column rule within said plurality of column rules, and each of said first and second end points of each column rule has the same y-coordinate of an end point of at least one row rule within said plurality of row rules;

providing one or more cells, each cell bordered by column and row rules included in said pluralities of column and row rules;

providing one or more row rule groups, each row rule group including one or more row rules of said plurality of row rules, each row rule in each row rule group having the same y-coordinate, and each row rule within said plurality of row rules being included in one and only one row rule group;

providing one or more column rule groups, each column rule group including one or more column rules of said plurality of column rules, each column rule in each column rule group having the same -coordinate, and each column rule within said plurality of column rules being included in one and only one column rule group;

receiving an x-coordinate and a y-coordinate, said x-coordinate and said y-coordinate defining a location on said 2-dimensional plane; and identifying a rule group using said location, wherein if said location is within a predetermined distance of a rule, the rule group which included said rule is identified, and if said location is not within a predetermined distance of a rule, a new rule group is created and identified.

19. In a computer, a method for designing a form system, said form system being drawn on a 2-dimensional plane represented by x- and y-coordinates, comprising the steps of:

providing a plurality of column rules wherein each column rule having first and second end points of the same x-coordinate;

providing a plurality of row rules wherein each row rule having first and second end points of the same y-coordinate, each of said first and second end points of each row rule ha the same coordinate as the x-coordinate of an end point of at least one column rule within said plurality of column rules, and each of said first and second end points of each column rule has the same y-coordinate of an end point of at least one row rule within said plurality of row rules;

providing one or more cells, each cell bordered by column and row rules included in said pluralities of column and row rules;

providing one or more row rule groups, each row rule group including one or more row rules of said plurality of row rules, each row rule in each row rule group having the same y-coordinate, and each row rule within said plurality of row rules being included in one and only one row rule group;

providing one or more column rule groups, each column rule group including one or more column rules of said plurality of column rules, each column rule in each column rule group having the same x-coordinate, and each column rule within aid plurality of column rules being included in one and only one column rule group;

receiving as input an x-coordinate and a y-coordinate, said x-coordinate and said y-coordinate defining a location on said 2-dimensional plane;

receiving as input a signal indicating whether an alignment grid is activated; and identifying a rule group using said location and said signal, wherein (i) if said location is within a predetermined distance of a rule, the rule group which included said rule is identified, (ii) if said location is not within a predetermined distance of a rule, but within a predetermined distance of a rule group, and said alignment grid is activated, said rule group is identified, and (iii) if said alignment grid is activated, said location is neither within a predetermined distance of a rule, nor within said predetermined distance of a rule group, a new rule group is created and identified.

20. In a computer, a method for designing a form structure, said form structure being drawn on a 2-dimensional plane represented by x- and y-coordinates, comprising the steps of:

providing a plurality of column rules wherein each column rule having first and second end points of the same x-coordinate;

providing a plurality of row rules wherein each row rule having first and second end points of the same y-coordinate, each of said first and second end points of each row rule has the same x-coordinate as the x-coordinate of an end point of at least one column rule within said plurality of column rules, and each of said first and second end points of each column rule has the same y-coordinate of an end point of at least one row rule within said plurality of row rules;

providing one or more cells each cell bordered by column and row rules included in said pluralities of column and row rules;

providing one or more row rule groups, each row rule group including one or more row rules of said plurality of row rules, each row rule in each row rule group having the same y-coordinate, and each row rule within said plurality of row rules being included in one and only one row rule group;

providing one or more column rule groups, each column rule group including one or ore column rules of said plurality of column rules, each column rule in each column rule croup having the same coordinate, and each column rule within said plurality of column rules being included in one and only one column rule group;

receiving as input an x-coordinate and a y-coordinate, said x-coordinate and said y-coordinate defining a location on said 2-dimensional plane;

receiving as input a signal indicating whether an alignment grid is activated; and identifying a rule group using said location and said signal, wherein
  (i) if said location is a predetermined distance of a rule group, and said alignment grid is activated, said rule group is identified,
  (ii) if said location is not within a predetermined distance of a rule group, but within a predetermined distance of a rule, the rule group which included said rule is identified, and
  (iii) if said alignment grid is activated and said location is neither within a predetermined distance of a rule, nor within said predetermined distance of a rule group, a new rule group is created and identified.

21. In a computer, a method for designing a form structure, said form structure being drawn on a 2-dimensional plane represented by x- and y-coordinates, comprising the steps of:

providing a plurality of column rules wherein each column rule having first and second end points of the same x-coordinate;

providing a plurality of row rules wherein each row rule having first and second end points of the same y-coordinate, each of said first and second end points of each row rule has the same x-coordinate as the x-coordinate of an end point of at least one column rule within said plurality of column rules, and each of said first and second end points of each column rule has the same y-coordinate of an end point of at east one row rule within said plurality of row rules;

providing one or more cells, each cell bordered by column and row rules included in said pluralities of column and row rules;

providing one or more row rule groups, each row rule group including one or more row rules of said plurality of row rules, each row rule in each row rule group having the same y-coordinate, and each row rule within said plurality of row rules being included in one and only one row rule group;

providing one or more column rule groups, each column rule group including one or more column rules of said plurality of column rules, each column rule in each column rule group having the same x-coordinate, and each column rule within said plurality of column rules being included in one and only one column rule group; and creating a hanging relationship between an end point of a first rule and a second rule, such that said end point of said first rule imposes a requirement of lying on said second rule, and wherein if said first rule is a column rule, then said second rule is a row rule, and if said first rule is a row rule, then said second rule is a column rule.

22. A method as in claim 21, further comprising the step of for shifting a rule group a directed distance, said shift creating one or more areas defined by the loci of points in the one or more rules within said rule group shifted said directed distance.

23. A method as in claim 22, further comprising the steps of:
  detecting an area overlap condition in which a rule overlaps said areas; and
  eliminating from said rule a portion of said rule overlapping said areas.

24. A method as in claim 22, further comprising the step of maintaining hanging relationships, wherein a first collection of rules, being rules having end points hanging onto a shifted rule before said shift, are extended or shrunk so as to maintain the requirements created by said step of creating a hanging relationship.

25. A method as in claim 24, wherein said setp of maintaining hanging relationship further creates hanging relationships after said shift between said shifted rule group and a second collection of rules, said second collection of rules being rules having end points hanging onto a portion of a rule eliminated in said step of eliminating as a result of said shift, each rule within said second collection of rules being extended or shrunk, so as to establish a requirement that the endpoint of said second collection rule lie on said selected rule.

26. A method as in claim 22, further comprising the step of providing means for eliminating cells located entirely within said areas, and for resizing cells partly overlapping said areas before said shift, by eliminating from said cells those portions of said cells overlapping said areas.

27. A method as in claim 22, wherein when said directed distance is along neither the x-direction nor the y-direction, said shift is a combination of a shift along the x-direction and a shift along the y-direction.

28. A method as in claim 22, further comprising the step of shifting multiple rule groups by a directed distance, said step of shifting multiple rule groups shifts said multiple rule groups, one rule group at a time and in a predetermined order.

29. A method as in claim 22, wherein said step of shifting multiple rule groups shifts said multiple rule groups such that:
  (i) if said shift includes a shift in the decreasing x-direction, the x-coordinate of each of said multiple rule groups, beginning with the rule group having the least x-coordinate;
  (ii) if said shift includes a shift in the increasing x-direction, the x-coordinate of each of said multiple rule groups, beginning with the rule group having the greatest x-coordinate;
  (ii) if said shift includes a shift in the decreasing y-direction, the y-coordinate of each of said multiple rule groups, beginning with the rule group having the least y-coordinate; and (iv) if said shift includes a shift in the increasing y-direction, the y-coordinate of each of said multiple rule groups, beginning with the rule group having the greatest y-coordinate.

30. In a computer, a method for designing a form structure, said form structure being drawn on a 2-dimensional plane represented by x- and y-coordinates, comprising the steps of:

providing a plurality of column rules wherein each column rule having first and second end points of the same x-coordinate;

providing a plurality of row rules wherein each row rule having first and second end points of the same y-coordinate, each of said first and second end points of each row rule has the same x-coordinate as the x-coordinate of an end point of at least one column rule within said plurality of column rules, and each of said first and second end points of each column rule has the same y-coordinate of an end point of at least one row rule within said plurality of row rules;

providing one or more cells, each cell bordered by column add row rules include in said pluralities of column and row rules;

providing one or more row rule groups, each row rule group including one or more row rues of said plurality of row rules, each row rule in each row rule group having the same y-coordinate, and each row rule within said plurality of row rules being included in one and only one row rule group:

providing one or more column rule groups, each column rule group including one or more column rules of said plurality of column rules, each column rule in each column rule group having the same coordinate, and each column rule within said plurality of column rules being included in one and only one column rule group;

receiving as input an identification of a rule group, and first and second coordinates, said first and second coordinates being y-coordinates when said rule group is a column rule group, and said first and second coordinates being x-coordinates when said rule group is a row rule group; and creating a new rule based on whether said rule group is a column rule group or a row rule group, and also on values of said first and second coordinates, wherein (i) if said rule group is a column rule group, said new rule is created as a column rule and added to said rule group, said new rule extending from a point within a first row rule intersecting said new rule, said first row rule being the intersecting row rule having the greatest y-coordinate which is less than or equal to the lesser of said first and second coordinates, to a point within a second row rule intersecting said new rule, said second row rule being the intersecting row rule having the least y-coordinate which is greater than or equal to the greater of said first and second coordinates; and (ii) if said rule group is a row rule group, said new rule is created as a row rule and added to said rule group, said new rule extending from a point within a first column rule intersecting said new rule, said first column rule being the intersecting column rule having the greatest x-coordinate which is less than or equal to the lesser of said first and second coordinates, to a point within a second column rule intersecting said new rule, said second column rule being the intersecting column rule having the least x-coordinate which is greater than or equal to the greater of said first and second coordinates.

31. A method as in claim 30, further comprising the steps of:

detecting a row rule overlap condition in which tow rules of rule group overlap each other;

eliminating, when said row rule overlapping condition is detected, from one of said overlapping row rules the portion of said row rule which overlaps the other one of said overlapping row rules, detecting a column rule overlap condition in which two column rules of a column rule group overlap each other: and eliminating, when such column rule condition is detected, from one of said overlapping column rules a portion of said column rule which overlaps the other one of said overlapping column rules.

32. In computer, a method for designing a form structure, said form structure being drawn on a 2-dimensional plane represented by x- and y-coordinates, comprising the steps of:

providing plurality of column rules wherein each column rule having first and second end points of the same x-coordinate;

providing a plurality of row rules wherein each row rule having first and second end points of the same y-coordinate each of said first and second end point of each row rule has the same x-coordinate as the x-coordinate of an end point of at least one column rule within said plurality of column rules, and each of said first and second end points of each column rule has the same y-coordinate of an end point of at least one row rule within said plurality of row rules;

providing one or more cells, each cell bordered by column and row rues included in said pluralities of column and row rules;

providing one or more row rule groups, each row rule group including one or more row rules of said plurality of row rules, each row rule in each row rule group having the same y-coordinate, and each row rule within said plurality of row rules being included in one and only one row rule group;

providing one or more column rule groups, each column rule group including one or more column rules of said plurality of column rules, each column rule in each column rule group having the same x-coordinate, and each column rule within said plurality of column rules being included in one and only one column rule group;

detecting a row rule overlap condition in which two row rules of a row rule group overlap each other;

eliminating, when said row rule overlap condition is detected from one of said overlapping row rules a portion of said row rule which overlaps the other one of said overlapping row rules, detecting a column rule overlap condition in which two column rules of a column rule group overlap each other; and eliminating, when said column rule overlap condition is detected, from one of said column rules a portion of said overlapping column rule which overlaps the other one of said overlapping column rules.

33. In a computer, a method for designing a form structure, said form structure being drawn on a 2- dimensional plane represented by x- and y-coordinates, comprising the steps of:

providing a plurality of column rules wherein each column rule having first and second end points of the same x-coordinate;

providing a plurality of row rules wherein each row rue having first and second end points of the same y-coordinate, each of said first and second end points of each row rule has the same x-coordinate as the x-coordinate of an end point of at least one column rule within said plurality of column rules, and each of said first and second end points of each column rule has the same y-coordinate of an end point of at least one row rule within said plurality of row rules;

providing one or more cells, each cell bordered by column and row rules included in said pluralities of column and row rules;

providing one or more row rule groups, each row rule group including one or more row rules of said plurality of row rules, each row rule in each row rule group having the same y-coordinate and each row rule within said plurality of row rules being included in one and only one row rule group;

providing one or more column rule groups, each column rule group including one or more column rules of said plurality of column rules, each column rule in each column rule group having the same x-coordinate, and each column rule within said plurality of column rules being included in one and only one column rule group; and changing the length of a designated rule, wherein said step of changing moves a designated end point of said designated rule according to a specified location, wherein:

(i) if said designated rule is a column rule, and said designated end point is the end point of said designated rule having the greater y-coordinate, the length of said designated rule is changed by relocating said designated end point to intersect the row rule having the least y-coordinate which is greater than or equal to the y-coordinate of said specified location, without causing a row rule which touches said designated rule prior to said relocation to become not touching a column rule within the column rule group of said designated rule after said relocation;

(ii) if said designated rule is a column rule, and said designated end point is the end point of said designated rule having the lesser y-coordinate, the length of said designated rule is changed by relocating said designated end point to intersect the row rule having the greatest y-coordinate which is less than or equal to the y-coordinate of said specified location, without causing a row rule which touches said designated rule prior to said relocation to become not touching a column rule within the column rule group of said designated rule after said relocation;

(iii) if said designated rule is a row rule, and said designated end point is the end point of said designated rule having the greater x-coordinate, the length of said designated rule is changed by relocating said designated end point to intersect the column rule having the least x-coordinate which is greater than or equal to the x-coordinate of said specified location without causing a column rule which touches said designated rule prior to said relocation to become not touching a row rule within the row rule group of said designated rule after said relocation; and (iv) if said designated rule is a row rule, and said designated end point is the end point of said designated rule having the lesser x-coordinate, the length of said designated rule is changed by relocating said designated end point to intersect the row rule having the greatest x-coordinate which is less than or equal to the x-coordinate of said specified location, without causing a column rule which touches said designated rule prior to said relocation to become not touching a row rule within the row rule group of said designated rule after said relocation.

34. In a computer, a method for designing a form structure, said form structure being drawn on a 2-dimensional plane represented by x- and y-coordinates, comprising the steps of:

providing a plurality of column rules wherein each column rule having first and second end points of the same x-coordinate;

providing a plurality of row rules wherein each row rule having first and second end points of the same y-coordinate, each of said first and second end points of each row rule has the same -coordinate as the x-coordinate of an end point of at last one column rule within said plurality of column rules, and each of said first and second end points of each column rule has the same y-coordinate of an end point of at least one row rule within said plurality of row rules;

providing one or more 1 s, each cell bordered by column and row rules included in said pluralities of column and row rules;

providing one or more row rule groups, each row rule group including one or more row rules of said plurality of row rules, each row rule in each row rule group having the same y-coordinate, and each row rule within said plurality of row rules being included in one and only one row rule group;

providing one or more column rule groups, each column rule group including one or more column rules of said plurality of column rules, each column rule in each column rule group having the same x-coordinate, and each column rule within said plurality of column rules being included in one and only one column rule group; and changing the length of a designated rule, said step of changing moves a designated end point of said designated rule according to a specified location, wherein:

(i) if said designated rule is a column rule, and said designated end point is the end point of said designated rule having the greater y-coordinate,
   (a) the length of said designated rule is changed by relocating said designated end point to intersect the row rule having the least y-coordinate which is greater than or equal to the y-coordinate of said specified location, and
   (b) the end point of a row rule, which lies on said designated rule prior to said relocation and which does not lie on a column rule within the column rule group of said designated rule after said relocation, is relocated in the direction of increasing length of said row rule to intersect a column rule;

(ii) if said designated rule is a column rule, and said designated end point is the end point of said designated rule having the lesser y-coordinate,
  (a) the length of said designated rule is changed by relocating said designated end point to intersect the row rule having the greatest y-coordinate which is less than or equal to the y-coordinate of said specified location, and
  (b) the end point of a row rule which lies on said designated rule prior to said relocation and which does not lie on a row rule within the column rule group of said designated rule after said relocation, is relocated in the direction of increasing length of said row rule to intersect a column rule;
(iii) if said designated rule is a row rule, and said designated end point is the end point of said designated rule having the greater x-coordinate,
  (a) the length of said designated rule is changed by relocating said designated end point to intersect the column rule having the least x-coordinate which is greater than or equal to the x-coordinate said specified location, and
  (b) the end point of a column rule which lies on said designated rule prior to said relocation and which does not lie on a row rule within the row rule group of said designated rule after said relocation is relocated in the direction of increasing length of said column rule to intersect a row rule; and
(iv) if said designated rule is a row rule, and said designated end point is the end point of said designated rule having the lesser x-coordinate,
  (a) the length of said designated rule is changed by relocating said designated end point to intersect the column rule having the greatest x-coordinate which is less than or equal to the x-coordinate of said specified location, and the end point of a column rule lying on said designated rule prior to said relocation and which does not lie on a row rule within the row rule group of said designated rule after said relocation, is relocated in the direction of increasing length of said column rule to intersect a row rule.

* * * * *